US010373128B2

(12) United States Patent
Smith et al.

(10) Patent No.: US 10,373,128 B2
(45) Date of Patent: Aug. 6, 2019

(54) DYNAMIC RESOURCE MANAGEMENT ASSOCIATED WITH PAYMENT INSTRUMENT EXCEPTIONS PROCESSING

(71) Applicant: BANK OF AMERICA CORPORATION, Charlotte, NC (US)

(72) Inventors: Michael Gerald Smith, Charlotte, NC (US); James F. Barrett, II, Morristown, NJ (US); Andrew Patrick Bastnagel, Charlotte, NC (US); Joshua Allen Beaudry, Jersey City, NJ (US); Eric Dryer, Charlotte, NC (US); Shawn Cart Gunsolley, Charlotte, NC (US); Marshall Bright Thompson, Charlotte, NC (US); Michael Matthew Wisser, Tega Cay, SC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 365 days.

(21) Appl. No.: 14/750,380

(22) Filed: Jun. 25, 2015

(65) Prior Publication Data

US 2016/0379184 A1 Dec. 29, 2016

(51) Int. Cl.
*G06Q 20/04* (2012.01)
*G06Q 30/02* (2012.01)
(Continued)

(52) U.S. Cl.
CPC .......... *G06Q 20/042* (2013.01); *G06Q 10/06* (2013.01); *G06Q 10/105* (2013.01);
(Continued)

(58) Field of Classification Search
CPC .. G06Q 10/1091; G06Q 10/06; G06Q 10/105; G06Q 40/125; G06Q 40/12
(Continued)

(56) References Cited

U.S. PATENT DOCUMENTS 3,737,628 A 6/1973 Azure, Jr.
4,417,136 A 11/1983 Rushby et al.
(Continued)

FOREIGN PATENT DOCUMENTS

EP 671696 9/1995
JP 9282387 10/1997
(Continued)

OTHER PUBLICATIONS

Jordan, J. Bern. Auto-generation of individualized, accessible user interfaces from a functionality-input-needs / user-sensible-input model. The University of Wisconsin—Madison, ProQuest Dissertations Publishing, 2015.*

(Continued)

*Primary Examiner* — Nathan C Uber
(74) *Attorney, Agent, or Firm* — Michael A. Springs; Moore & Van Allen PLLC; Nicholas C. Russell

(57) ABSTRACT

Embodiments of the invention include systems, methods, and computer-program products for dynamic resource management for managing payment exception processing and maximize work flow. In this way, the system may lift data from financial documents received from sources to allow for exception processing. The exceptions may include one or more irregularities such as bad micro line reads, outdated check stock, or misrepresentative checks that may result in a failure to match the check to an associated account for processing. As such, once an exception is identified during the processing the exception is directed to an appropriate resource for processing. The system monitors work flow nodes and resource experience to prevent bottlenecks or underutilization. Furthermore, the system employs awards and gamification models for exception processing.

16 Claims, 10 Drawing Sheets

(51) Int. Cl.
*G06Q 40/00* (2012.01)
*G06Q 10/06* (2012.01)
*G06Q 10/10* (2012.01)
G06K 9/18 (2006.01)
G06Q 20/10 (2012.01)
G06Q 30/06 (2012.01)
G06Q 40/04 (2012.01)
G06Q 20/20 (2012.01)

(52) U.S. Cl.
CPC ..... *G06Q 10/1091* (2013.01); *G06Q 30/0222* (2013.01); *G06Q 40/12* (2013.12); *G06Q 40/125* (2013.12); *G06K 9/18* (2013.01); *G06K 2209/01* (2013.01); *G06Q 20/10* (2013.01); *G06Q 20/20* (2013.01); *G06Q 30/06* (2013.01); *G06Q 40/04* (2013.01)

(58) Field of Classification Search
USPC .......................................................... 705/32
See application file for complete search history.

(56) References Cited

U.S. PATENT DOCUMENTS

| | | |
|---|---|---|
| 4,523,330 A | 6/1985 | Cain |
| 4,555,617 A | 11/1985 | Brooks et al. |
| 4,947,321 A | 8/1990 | Spence et al. |
| 5,007,100 A | 4/1991 | D'Aoust et al. |
| 5,077,805 A | 12/1991 | Tan |
| 5,097,517 A | 3/1992 | Holt |
| 5,121,945 A | 6/1992 | Thomson et al. |
| 5,159,548 A | 10/1992 | Caslavka |
| 5,167,013 A | 11/1992 | Hube et al. |
| 5,198,975 A | 3/1993 | Baker et al. |
| 5,257,328 A | 10/1993 | Shimizu |
| 5,326,104 A | 7/1994 | Pease et al. |
| 5,433,483 A | 7/1995 | Yu |
| 5,550,932 A | 8/1996 | Blaylock et al. |
| 5,594,226 A | 1/1997 | Steger |
| 5,678,046 A | 10/1997 | Cahill et al. |
| 5,679,940 A | 10/1997 | Templeton et al. |
| 5,740,271 A | 4/1998 | Kunkler et al. |
| 5,754,673 A | 5/1998 | Brooks et al. |
| 5,781,654 A | 7/1998 | Carney |
| 5,842,577 A | 12/1998 | Stevens et al. |
| 5,895,455 A | 4/1999 | Bellinger et al. |
| 5,917,965 A | 6/1999 | Cahill et al. |
| 5,926,392 A | 7/1999 | York et al. |
| 5,940,844 A | 8/1999 | Cahill et al. |
| 5,963,659 A | 10/1999 | Cahill et al. |
| 6,073,121 A | 6/2000 | Ramzy |
| 6,115,494 A | 9/2000 | Sonoda et al. |
| 6,128,401 A | 10/2000 | Suzuki et al. |
| 6,129,273 A | 10/2000 | Shah |
| 6,181,837 B1 | 1/2001 | Cahill et al. |
| 6,188,787 B1 | 2/2001 | Ohmae et al. |
| 6,351,553 B1 | 2/2002 | Hayosh |
| 6,384,844 B1 | 5/2002 | Stewart et al. |
| 6,574,377 B1 | 6/2003 | Cahill et al. |
| 6,600,823 B1 | 7/2003 | Hayosh |
| 6,863,214 B2 | 3/2005 | Garner et al. |
| 6,959,326 B1 | 10/2005 | Day et al. |
| 7,004,382 B2 | 2/2006 | Sandru |
| 7,090,131 B2 | 8/2006 | Natsuno |
| 7,092,561 B2 | 8/2006 | Downs, Jr. |
| 7,124,113 B1 | 10/2006 | Fairclough et al. |
| 7,165,723 B2 | 1/2007 | McClamery et al. |
| 7,349,884 B1 | 3/2008 | Odom et al. |
| RE40,220 E | 4/2008 | Nichols et al. |
| 7,379,978 B2 | 5/2008 | Anderson et al. |
| 7,389,914 B1 | 6/2008 | Enright et al. |
| 7,391,934 B2 | 6/2008 | Goodall et al. |
| 7,461,775 B2 | 12/2008 | Swift et al. |
| 7,471,818 B1 | 12/2008 | Price et al. |
| 7,494,052 B1 | 2/2009 | Carpenter et al. |
| 7,606,408 B2 | 10/2009 | Takiguchi |
| 7,680,317 B2 | 3/2010 | Adelberg et al. |
| 7,680,318 B2 | 3/2010 | Agrawal et al. |
| 7,689,025 B2 | 3/2010 | Takiguchi |
| 7,693,305 B2 | 4/2010 | Emerson et al. |
| 7,697,728 B2 | 4/2010 | Emerson et al. |
| 7,702,588 B2 | 4/2010 | Gilder et al. |
| 7,706,275 B2 | 4/2010 | Archer et al. |
| 7,735,721 B1 | 6/2010 | Ma et al. |
| 7,752,286 B2 | 7/2010 | Anderson |
| 7,757,938 B2 | 7/2010 | Richardson et al. |
| 7,769,772 B2 | 8/2010 | Weyl et al. |
| 7,856,403 B2 | 12/2010 | Venturo et al. |
| 7,950,698 B2 | 5/2011 | Popadic et al. |
| 7,962,412 B2 | 6/2011 | Omura et al. |
| 7,970,706 B2 | 6/2011 | Keene |
| 8,045,818 B2 | 10/2011 | Sato et al. |
| 8,052,040 B2 | 11/2011 | Stover |
| 8,155,425 B1 | 4/2012 | Mandel |
| 8,162,125 B1 | 4/2012 | Csulits et al. |
| 8,229,203 B2 | 7/2012 | Faulkner et al. |
| 8,358,826 B1 | 1/2013 | Medina et al. |
| 8,437,529 B1 | 5/2013 | Mennie et al. |
| 8,438,427 B2 | 5/2013 | Beck et al. |
| 8,467,591 B1 | 6/2013 | Csulits |
| 8,516,301 B2 | 8/2013 | Beck et al. |
| 8,606,705 B2 | 12/2013 | Zanzot et al. |
| 8,655,047 B1 | 2/2014 | Walker et al. |
| 8,712,143 B2 | 4/2014 | Tran |
| 8,864,029 B2 | 10/2014 | McGlamery et al. |
| 9,176,760 B2 | 11/2015 | Halambi et al. |
| 9,317,484 B1 | 4/2016 | Ho |
| 9,436,623 B2 | 9/2016 | Wertheimer et al. |
| 9,779,392 B1 | 10/2017 | Prasad et al. |
| 2001/0051921 A1 | 2/2001 | Garner, IV et al. |
| 2001/0006556 A1 | 7/2001 | Graves et al. |
| 2002/0000995 A1 | 1/2002 | Sawada et al. |
| 2002/0023053 A1 | 2/2002 | Szoc et al. |
| 2002/0037097 A1 | 3/2002 | Hoyos et al. |
| 2002/0051562 A1 | 5/2002 | Sheppard et al. |
| 2002/0067846 A1 | 6/2002 | Foley |
| 2002/0104782 A1 | 8/2002 | DeWitt et al. |
| 2002/0169861 A1 | 11/2002 | Chang et al. |
| 2003/0140007 A1 | 7/2003 | Kramer et al. |
| 2003/0208440 A1 | 11/2003 | Harada et al. |
| 2003/0236877 A1 | 12/2003 | Allan |
| 2004/0076320 A1 | 4/2004 | Downs |
| 2004/0131242 A1 | 7/2004 | Klevtsov |
| 2004/0133516 A1 | 7/2004 | Buchanan et al. |
| 2004/0215560 A1 | 10/2004 | Amalraj et al. |
| 2004/0217170 A1 | 11/2004 | Takiguchi et al. |
| 2005/0010524 A1 | 1/2005 | Gutbrod et al. |
| 2005/0094861 A1 | 5/2005 | Prakash et al. |
| 2005/0097019 A1 | 5/2005 | Jacobs |
| 2005/0139670 A1 | 6/2005 | McGlamery et al. |
| 2005/0139671 A1 | 6/2005 | McGlamery et al. |
| 2005/0144189 A1 | 6/2005 | Edwards et al. |
| 2005/0160039 A1 | 7/2005 | Garner et al. |
| 2005/0189272 A1 | 9/2005 | DiBiaso et al. |
| 2005/0281449 A1 | 12/2005 | Takiguchi |
| 2005/0281450 A1 | 12/2005 | Richardson |
| 2006/0031122 A1 | 2/2006 | Lane et al. |
| 2006/0041506 A1 | 2/2006 | Mason et al. |
| 2006/0088199 A1 | 4/2006 | Shizuka et al. |
| 2006/0095364 A1 | 5/2006 | Hamilton et al. |
| 2006/0106717 A1 | 5/2006 | Randle et al. |
| 2006/0144937 A1 | 7/2006 | Heilper et al. |
| 2006/0184441 A1 | 8/2006 | Haschka et al. |
| 2006/0186194 A1 | 8/2006 | Richardson et al. |
| 2006/0191998 A1 | 8/2006 | Mueller et al. |
| 2006/0219773 A1 | 10/2006 | Richardson |
| 2007/0019855 A1 | 1/2007 | Marlett et al. |
| 2007/0045930 A1 | 3/2007 | Hayduchok et al. |
| 2007/0061260 A1 | 3/2007 | deGroeve et al. |
| 2007/0064991 A1 | 3/2007 | Douglas et al. |
| 2007/0156438 A1 | 7/2007 | Popadic et al. |
| 2007/0162387 A1 | 7/2007 | Cataline et al. |
| 2007/0172109 A1 | 7/2007 | Agrawal et al. |
| 2007/0198437 A1 | 8/2007 | Eisner et al. |

(56) References Cited

U.S. PATENT DOCUMENTS

| | | |
|---|---|---|
| 2007/0215691 A1 | 9/2007 | Swift et al. |
| 2007/0217669 A1 | 9/2007 | Switft et al. |
| 2007/0267477 A1 | 11/2007 | Schott et al. |
| 2007/0288382 A1 | 12/2007 | Narayanan et al. |
| 2008/0015985 A1 | 1/2008 | Abhari et al. |
| 2008/0040249 A1 | 2/2008 | Re et al. |
| 2008/0063278 A1 | 3/2008 | Vincent et al. |
| 2008/0086420 A1 | 4/2008 | Gilder et al. |
| 2008/0135610 A1 | 6/2008 | Roh |
| 2008/0137939 A1 | 6/2008 | Wang et al. |
| 2008/0140552 A1 | 6/2008 | Blaikie |
| 2008/0168439 A1 | 7/2008 | Anderson et al. |
| 2008/0195537 A1 | 8/2008 | Schulz |
| 2008/0232648 A1 | 9/2008 | Emerson et al. |
| 2008/0262950 A1* | 10/2008 | Christensen ......... G06Q 20/042 705/30 |
| 2008/0279455 A1 | 11/2008 | Wall |
| 2008/0284799 A1 | 11/2008 | Hollemans et al. |
| 2008/0290181 A1 | 11/2008 | Dimitri et al. |
| 2008/0294554 A1 | 11/2008 | Neotytides et al. |
| 2009/0018960 A1 | 1/2009 | Gawne |
| 2009/0034848 A1 | 2/2009 | Sakamoto et al. |
| 2009/0034849 A1 | 2/2009 | Grosvenor |
| 2009/0037339 A1 | 2/2009 | Ancell et al. |
| 2009/0114715 A1 | 5/2009 | Mueller et al. |
| 2009/0164372 A1 | 6/2009 | Dell et al. |
| 2009/0236413 A1 | 9/2009 | Mueller et al. |
| 2009/0324053 A1 | 12/2009 | Ross et al. |
| 2010/0036775 A1 | 2/2010 | Edens |
| 2010/0122216 A1 | 5/2010 | Song et al. |
| 2010/0211499 A1 | 8/2010 | Zanzot et al. |
| 2010/0280859 A1 | 11/2010 | Frederick, II |
| 2010/0280871 A1 | 11/2010 | Goertz et al. |
| 2011/0091092 A1 | 4/2011 | Nepomniachtchi et al. |
| 2011/0206266 A1 | 8/2011 | Faulkner et al. |
| 2011/0219208 A1 | 9/2011 | Asaad et al. |
| 2011/0251956 A1 | 10/2011 | Cantley et al. |
| 2011/0264572 A1 | 10/2011 | Cucinotta |
| 2011/0280450 A1 | 11/2011 | Nepomniachtchi et al. |
| 2012/0140624 A1 | 6/2012 | Denman et al. |
| 2012/0189186 A1 | 7/2012 | Csulits et al. |
| 2013/0056531 A1 | 3/2013 | Sato et al. |
| 2013/0067069 A1 | 3/2013 | Allen et al. |
| 2013/0067074 A1 | 3/2013 | Allen et al. |
| 2013/0124414 A1 | 5/2013 | Roach et al. |
| 2013/0185200 A1 | 7/2013 | Neinast et al. |
| 2013/0229911 A1 | 9/2013 | Nagata et al. |
| 2013/0239185 A1 | 9/2013 | Orttung et al. |
| 2013/0243303 A1 | 9/2013 | Imae et al. |
| 2013/0287284 A1 | 10/2013 | Nepomniachtchi et al. |
| 2013/0325706 A1 | 12/2013 | Wilson et al. |
| 2014/0052697 A1 | 2/2014 | Williams et al. |
| 2014/0112282 A1 | 4/2014 | Wijting et al. |
| 2014/0153787 A1 | 6/2014 | Schmidtler et al. |
| 2014/0164194 A1 | 6/2014 | Landry, Jr. et al. |
| 2014/0195967 A1 | 7/2014 | Abe et al. |
| 2014/0233835 A1 | 8/2014 | Sandoz et al. |
| 2014/0233837 A1 | 8/2014 | Sandoz et al. |
| 2014/0359672 A1 | 12/2014 | Lefor |
| 2015/0012442 A1 | 1/2015 | Ceribelli et al. |
| 2015/0378539 A1 | 12/2015 | Nickolaevich et al. |
| 2016/0182328 A1 | 6/2016 | Bhasin et al. |

FOREIGN PATENT DOCUMENTS

| | | |
|---|---|---|
| WO | WO 2005066880 | 7/2005 |
| WO | WO 2005081917 | 9/2005 |

OTHER PUBLICATIONS

European Search Report completed May 27, 2010 for European Application No. EP 10 25 0246.
International Search Report and the Written Opinion of the International Searching Authority received Apr. 12, 2010 for International Application No. PCT/US2010/24123 Apr. 2, 2010 for International Application No. PCT/US 10/24123.
International Search Report and the Written Opinion of the International Searching Authority received Apr. 19, 2010 for International Application No. PCT/US2010/24113 Apr. 12, 2010 for International Application No. PCT/US 10/24113.
Extended European Search Report dated Jun. 1, 2010 for European Application No. EP 10 25 0245.
Instituto Mexican de la Propiedad Industrial. Mexico Office Action dated May 29, 2012. Mexico Application No. MX/a/2010/001718. Name of Applicant: Bank of America Corporation. Spanish Language. 3 pages.
European Patent Office. European Application No. 10 250 245.7-1955. European Office Action dated May 6, 2013. Name of Applicant: Bank of America Corporation. 7 pages.
Instituto Mexican de la Propiedad Industrial. Mexico Office Action dated Apr. 8, 2013. Mexico Application No. MX/a/2010/001717. Name of Applicant: Bank of America Corporation. Spanish Language. 3 pages.
Instituto Mexicano de la Propiedad Industrial. Mexico Office Action dated Apr. 8, 2013. Mexico Application No. MX/a/2010/001717. Name of Applicant: Bank of America Corporation. English Language Summary. 1 page.
Instituto Mexicano de la Propiedad Industrial. Mexico Office Action dated May 29, 2012. Mexico Application No. MX/a/2010/001718. Name of Applicant: Bank of America Corporation. English Language Summary. 1 page.
Examination Report for related European Patent Application No. 10250246.5 dated Oct. 22, 2013.
International Preliminary Report on Patentability dated Aug. 25, 2011 for PCT/US2010/024113.
International Preliminary Report on Patentability dated Aug. 25, 2011 for PCT/US2010/024123.
"Instant verification of check quality and usability," Parascript, LLC, Longmont, Colorado, retrieved from the World Wide Web on Jul. 17, 2012, 2 pages.
"Check 21: Harnessing a Billion Points of Light," Mercator Advisory Group, May 24, 2004, Maynard, Massachusetts, retrieved from the Internet on Oct. 3, 2015; 3 pages.
"Check Encoders," Starex Financial Systems—Banking Equipment. com, Northridge, California, retrieved from the World Wide Web on Jul. 17, 2012, 3 pages.
"Let's face it—it's hard to keep up," Silver Bullet Technology, Inc., Pensacola, Florida, retrieved from the World Wide Web on Jul. 17, 2012, 2 pages.
Klein, Bob, et al., "Image Quality and Usability Assurance: Phase 1 Project," The Financial Services Technology Consortium (Available from BITS—The Financial Services Roundtable, Washington, D.C.), Aug. 23, 2004, 68 pages.
"Electronic check processing solutions: Choosing the right option for retail payments," First Data, 2008, Atlanta, Georgia; 16 pages.
"Reduce exception item processing costs: New technology paves the way to new saving," Cummins Allison Corporation, Mt. Prospect, Illinois, retrieved from the Internet on Oct. 3, 2015, 6 pages.
"Check 21 and Image Security," The Standard Register Company, Dec. 8, 2003, Wayne, New Jersey, 9 pages.
"X9LIB Software Development Toolkit," All My Papers, Aug. 8, 2012, Saratoga, California, 3 pages.
"MICR V Encoder M-570D," Progressive Business Systems, Inc., 2011, Auburn, Georgia, 2 pages.
"Correcting the Codeline (MICR line)," Financial Management Service—A Bureau of the United States Department of the Treasury, Washington, D.C, retrieved from the World Wide Web on Jul. 18, 2012, 4 page.
"Vision IP:Check21—Delivering an end-to-end, image-enabled electronic payments environment," Metavante Corporation, 2008, Milwaukee, Wisconsin, 5 pages.
Higgins, R., "Ramifications of MICR Mismatch in Check Image Exchange", All My Papers Publication, Jan. 2008, 16 pages.
Malchar, R., "The Value of MICR for the Remote Check Depositor", PANINI Advanced Solutions for Document Processing, 2008, 24 pages.

(56) References Cited

OTHER PUBLICATIONS

Higgins, R., "Small Check Scanner MICR Read Performance Benchmark Study", Feb. 27, 2006, 7 pages.
Canadian Office Action dated Oct. 30, 2012 for Application No. 2,546,849.
International Preliminary Report on Patentability for International Application No. PCT/US2004/043832 dated Jul. 3, 2006
International Search Report for International Application No. PCT/US2004/043832 dated May 19, 2005.
Written Opinion for International Application No. PCT/US2004/043832 received May 17, 2005.
Foitek Introduces PADsafe Toolkit to Detect Preauthorized Draft Fraud; New Product Helps Banks Prevent Losses Due to Fraudulent Preauthorized Drafts, PR Newswire Feb. 10, 2004: NA.
A New Methodology for Gray-Scale Character Segmentation and Recognition, Lee, et al. IEEE Transactions on Pattern Analysis and Machine Intelligence, vol. 18, No. 10, Oct. 1996.

\* cited by examiner

DYNAMIC RESOURCE MANAGEMENT ASSOCIATED WITH PAYMENT INSTRUMENT EXCEPTIONS PROCESSING

BACKGROUND

Entities typically receive large volumes of documents from vendors, customers, or employees on any given day. Each document, especially if it is a financial document, is typically reconciled with a financial account associated with the financial document. In this way, specific characteristics of a document are matched to a corresponding account.

However, sometimes no match can be made between the document and a corresponding account. As such, when an exception occurs, an individual may have to look to other characteristics of the document for reconciliation purposes.

BRIEF SUMMARY

Embodiments of the present invention address the above needs and/or achieve other advantages by providing apparatuses (e.g., a system, computer program product and/or other devices) and methods for dynamic resource management for managing payment exception processing and maximize work flow. As such, monitoring work flow nodes in the document exception processing system to identify and determine bottlenecks and/or underutilization of resources. The system monitors the work flow nodes and reallocates resources appropriately depending on the bottlenecks or underutilization.

The document, specifically payment instrument, exception processing allows automated decisions for exception processing to systematically resolve exceptions. The exceptions may include one or more irregularities such as bad micro line reads, outdated check stock, or misrepresentative checks that may result in a failure to match the check to an associated account for processing. In some embodiments, the metadata may be used for automated payment stops in response to detecting a suspect document or time. In yet other embodiments, the metadata may be used for automated decisions for detecting and/or eliminating duplicate check processing.

In some embodiments, the system may receive images of financial documents from one or more sources. The financial documents may be received from within an entity, from other financial institutions, or the like. In some embodiments, the images include images of checks or other financial documents captured by an account holder or other entity. From the received financial documents or payment instruments, the system may detect data from the financial record image. This information may be any written or printed information on the front or back of the payment instrument. The documents or payment instruments may include a myriad of financial documents, including but not limited to checks, lease documents, mortgage documents, deposit slips, payment coupons, receipts, general ledger tickets, or the like.

In the present invention, once the financial document is received, the invention may extract and process the document or the image of the document. In some embodiments, the system may extract data, in the form of metadata from a text document. The document, which may be a check or the like, may be utilized to extract and/or collect the information associated with the document into metadata instead of image or text data. The invention may then utilize the data to further process the received document. The data may include information such as an account data, dates, payee, payor, addresses, routing numbers, amounts, document backgrounds, or other information that may be imperative to processing that document. The system may then store the data collected from the document.

In some embodiments, the data collected from the document may be processed and stored as data associated with the document. In this way, the image of the document may be captured and the data reprocessed into text or non-image data for storage. As such, numbers, letters, or the like on the document may be captured as part of the document image, but be stored as text data.

In some embodiments, the system may extract the data from financial document images or other image data. This data may be lifted off of the financial documents and extracted as metadata. Metadata is data about the image data found on a financial document, such as a check, or the like. In some embodiments, the data may be structural metadata. As such, the data may be about the design and specification of the structure of the data. In other embodiments, the data may be descriptive metadata. As such, the data may be data describing in detail the content of the financial record or document. In some embodiments, the metadata as described herein may take the form of structural, descriptive and/or a combination thereof.

In order to extract the metadata from one or more documents or images optical character recognition may be utilized. In this way, optical character recognition may be used to extract the metadata from financial documents, such as text documents and financial record images, such as checks or other financial instruments.

Specifically, in some embodiments the extracted data is utilized to allow for automated decisions for exception processing to systematically resolve exceptions. In some embodiments, the exception processing to resolve exceptions is done manually by an individual user or resource. The exceptions may include one or more irregularities such as bad micro line reads, outdated check stock, or misrepresentative checks that may result in a failure to match the check to an associated account for processing. As such, once an exception is identified during the processing the metadata lifted from the document with the exception may be utilized to search financial records at the financial institution to attempt to identify the correct version of the document. Subsequently, the system may correct the irregularity systematically and automatically.

In yet other embodiments, the data may be used for automated decisions for detecting and/or eliminating duplicate check processing. In some embodiments, the decisions and detecting or eliminating duplicate checks may be done manually by a user or individual resource. In this way, the system will lift data associated with a financial document received. The data may then be compared to metadata from previous financial documents received. If there exists an exact match between the two sets of metadata the invention will notify the user and identify the duplicate financial document. Furthermore, the system will eliminate the duplicate if necessary.

In some embodiments, the automated decisions for exception processing to systematically resolve exceptions and the automated decisions for detecting or eliminating duplicate checks may further include a confidence rating that the automated decisioning accuracy. In some embodiments, users or individual resources are utilized as a check of the automatic system to confirm the accuracy.

Resources for decisioning for exception processing and for detecting duplicate documents may have backlogs, bottlenecks, or underutilization based on the demands on the resource.

As such, monitoring work flow nodes in the document exception processing system is required to identify and determine bottlenecks and/or underutilization of resources. The system monitors the work flow nodes and reallocates resources appropriately depending on the bottlenecks or underutilization.

In some embodiments, in order to reallocate resources, the system may employ one or more rules and/or parameters associated with specific resources, such as the resource experience level, resource scarcity, resource availability, resource work logs, and the light in order to reallocate the resources appropriately.

In some embodiments, the invention employs gamification for resources to incentivize and identify resource experiences and resource attributes. In this way, the system may insert or distribute du my items or other concepts for testing real time accuracy of the resources. The system may further process errors to determine group-wide and resource level trends. As such, allowing managers access for real time access to errors, production, or reviews of individual resources. The system may also alert managers as to whether resources will be needed to finalize items or allocate specific items to complete tasks.

Embodiments of the invention relate to systems, methods, and computer program products for document exception processing resource management, the invention comprising: receiving an indication of a user transaction, wherein receiving an indication of the user transaction comprises receiving a copy of a financial documents associated with the user transaction for processing, wherein the financial documents associated with the user transaction are checks; identifying data from the financial document, wherein the data from the financial document is extracted from the financial document using optical character recognition and the data is stored; processing the financial document; identifying and categorizing exceptions in the financial documents being processing; monitoring work flow of resources for exception processing, wherein monitoring of work flow identifies bottlenecks and underutilization of resources for exception processing; determining resource experience and error rate for each of one or more different exception types; matching an appropriate resource with the identified and categorized exception based on the resource experience, resource scarcity, and resource error rate for the category of exception; and replacing the exception, upon resource correction of exception, and allow the financial document comprising the exception to be processed.

In some embodiments, the invention further comprises matching, systematically, an appropriate financial account to the financial document comprising exceptions, wherein the match is based on the comparison between extracted data from the financial document comprising exceptions to known data associated with financial accounts; determining a confidence of correction for the systematic matching; directing, based on a confidence level lower than a predetermined threshold, the financial document comprising exceptions to a resource to confirm the systematic matching; and replacing, upon resource confirmation, the exception and allow the financial document comprising the exception to be processed.

In some embodiments, monitor work flow of resources for exception processing further comprises providing dummy exceptions for monitoring real-time work flow of resource.

In some embodiments, the invention further comprises superimposing gamification and reward data on a display for the resource such that exception processing is performed by the resource via the superimposed display. In some embodiments, gamification comprises superimposing performance based race system for comparison of productivity of resource relative to exemplary resource in real-time.

In some embodiments, the invention further comprising providing managers of the resources with real-time access to resource errors and resource production.

In some embodiments, processing the financial documents further comprises directing a financial document without an exception to an appropriate financial account associated with the financial document such that payment for the user transaction associated with the financial document is completed.

In some embodiments, identifying data from the transaction documents associated with the user transaction further comprises capturing via optical character recognition, images of various elements of the transaction documents, wherein the various elements are unique to the transaction documents, wherein the identified data is stored as metadata.

In some embodiments, exceptions comprise one or more irregularities in the financial documents such as bad micro line reads, outdated check stock, or misrepresentative checks.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
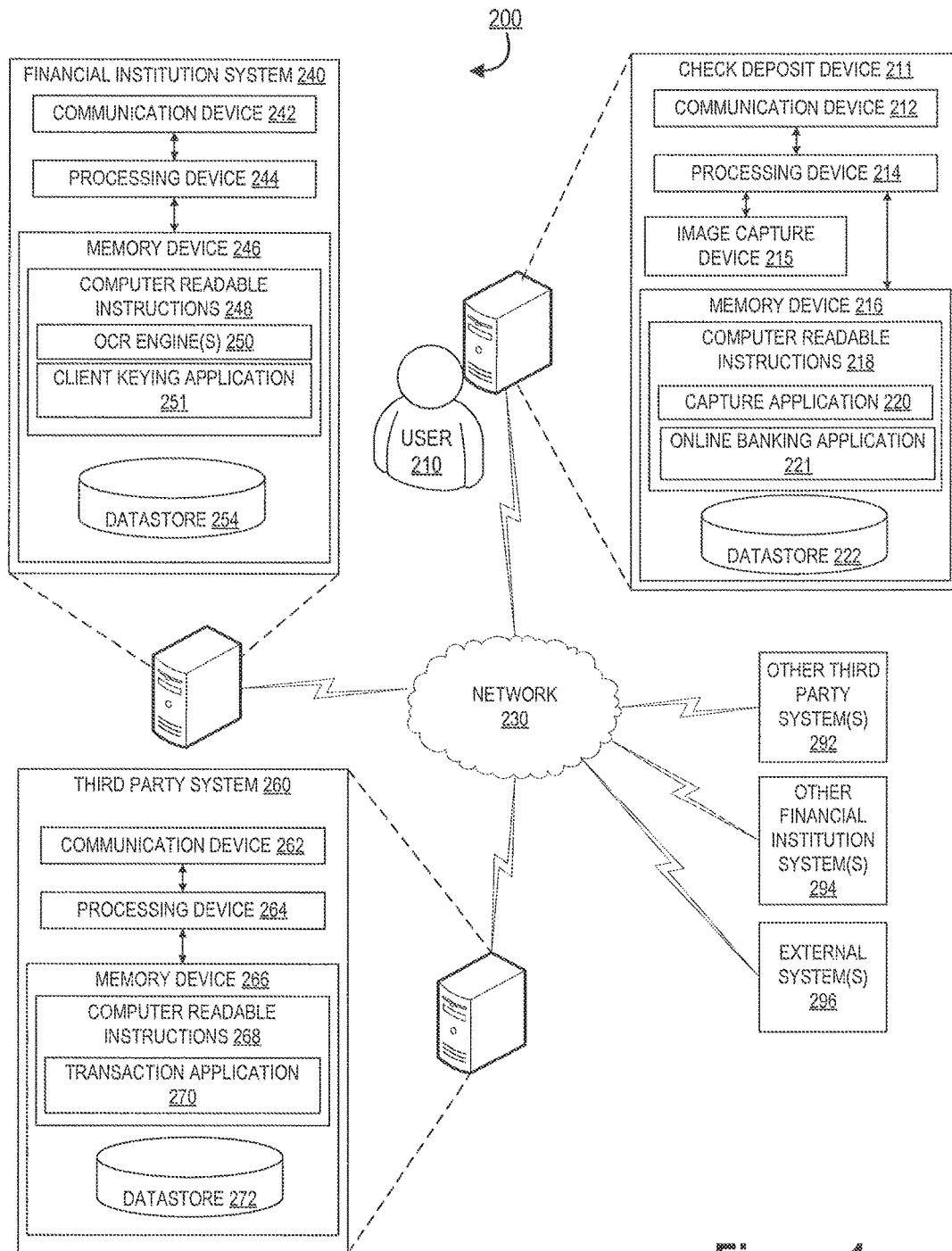
Figure 2A:
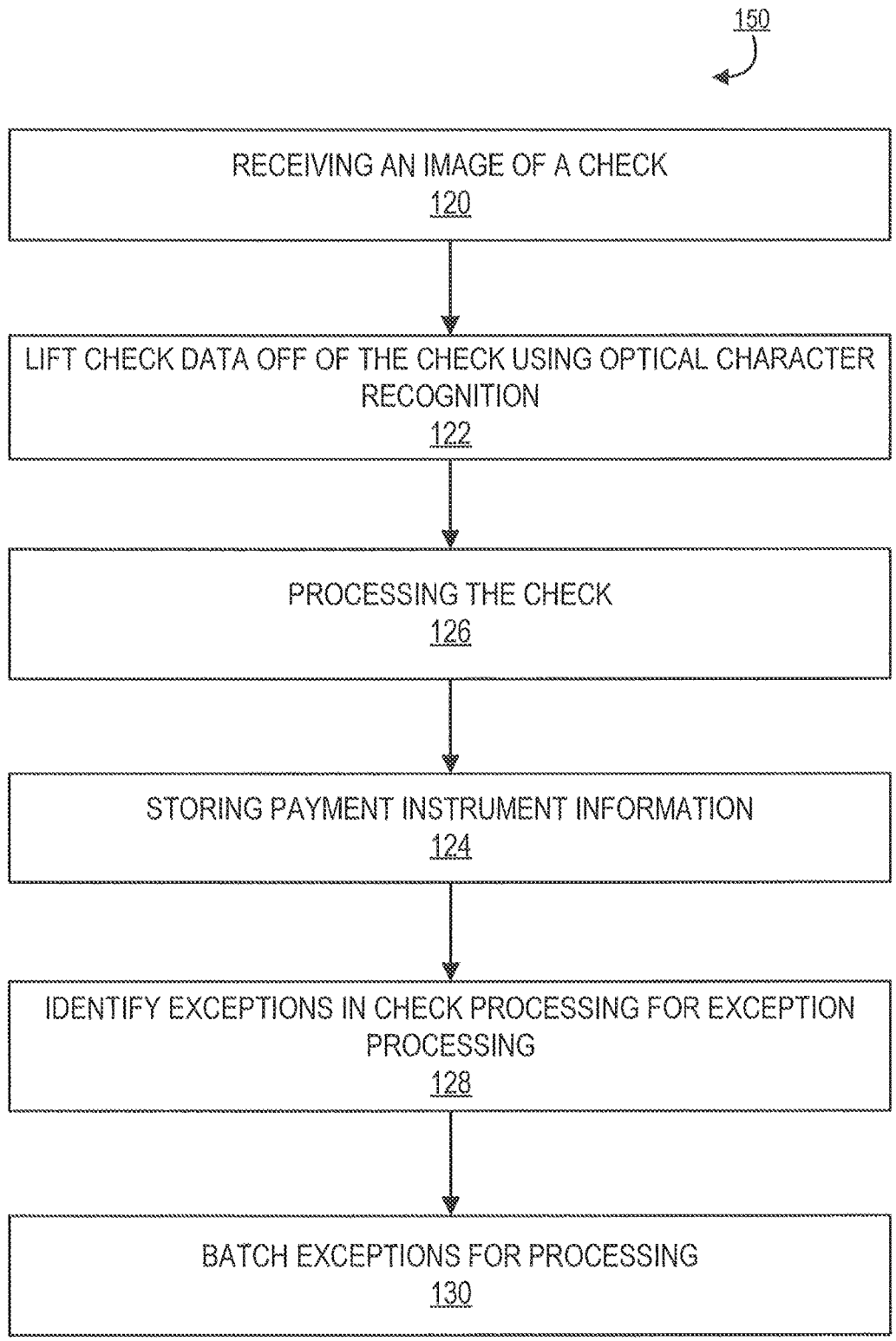
Figure 2B:
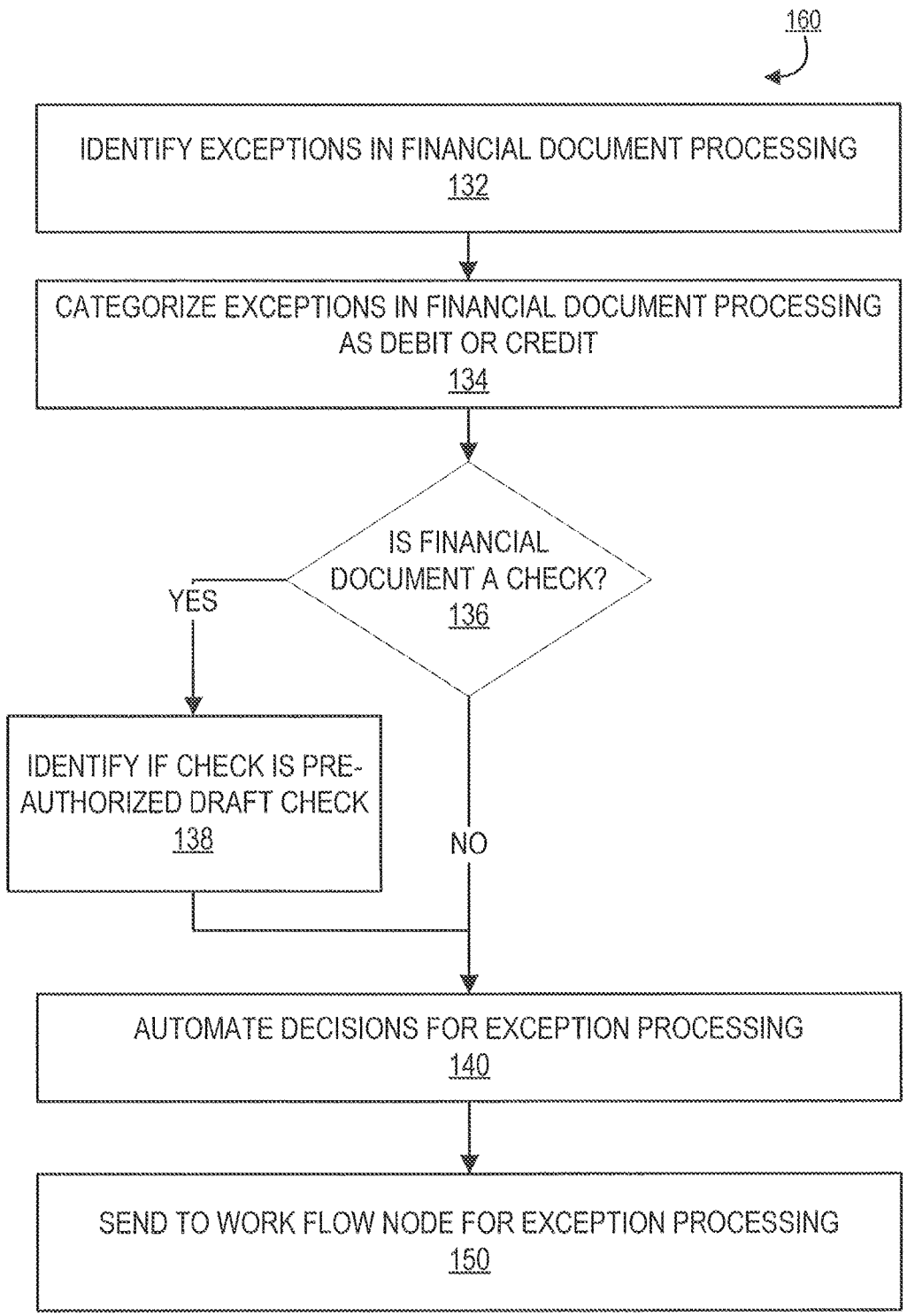
Figure 3:
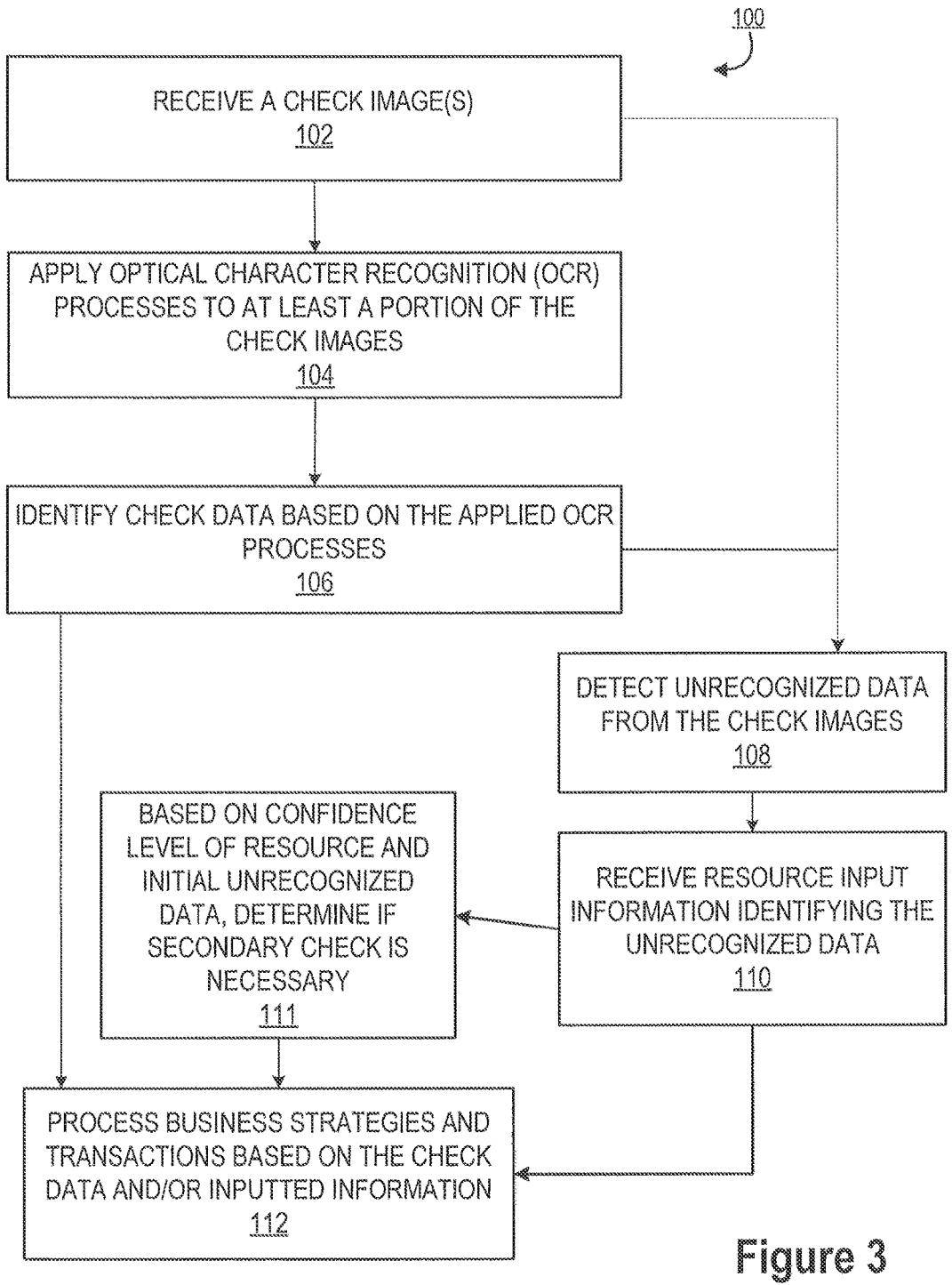
Figure 4:
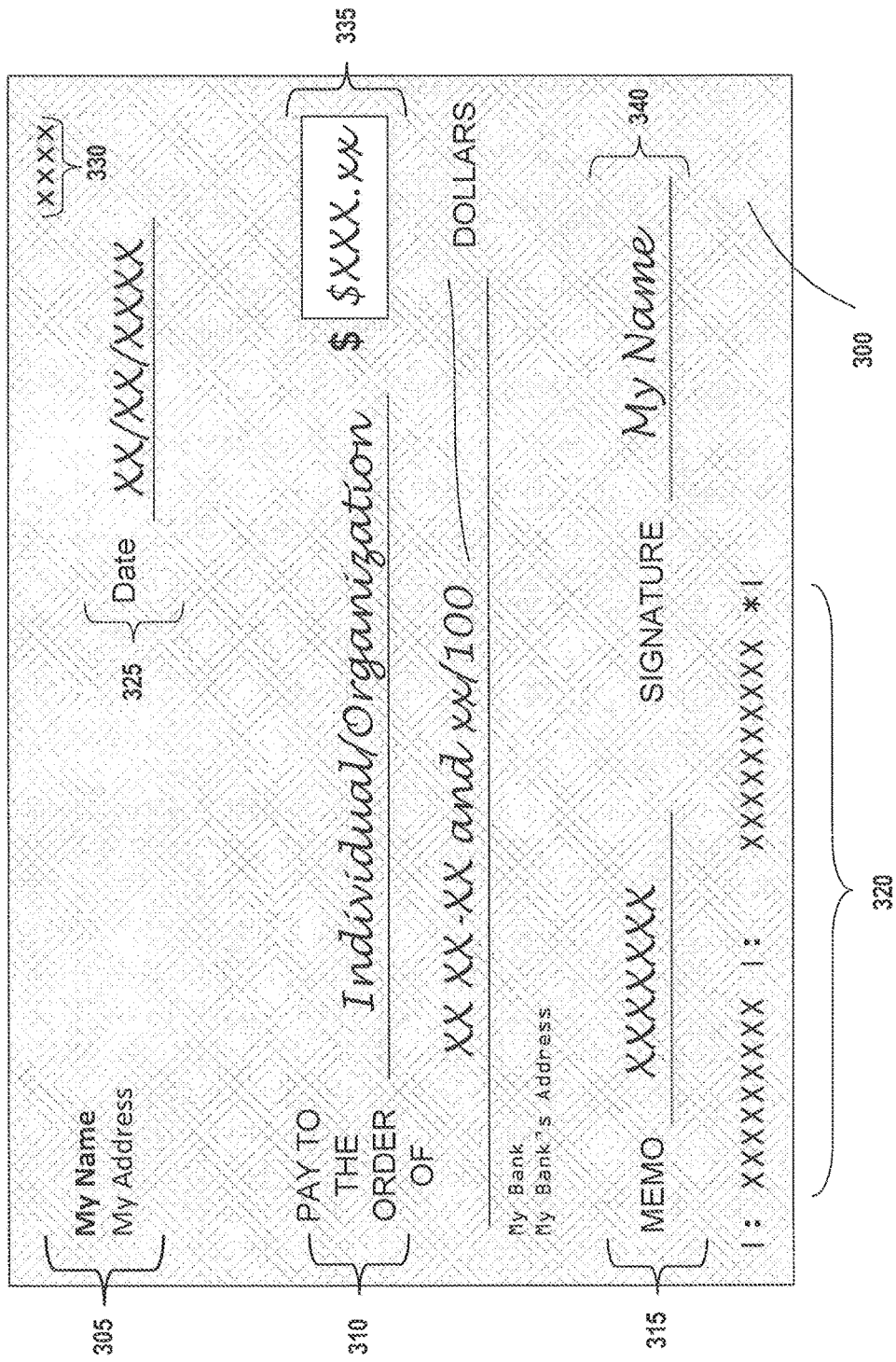
Figure 5:
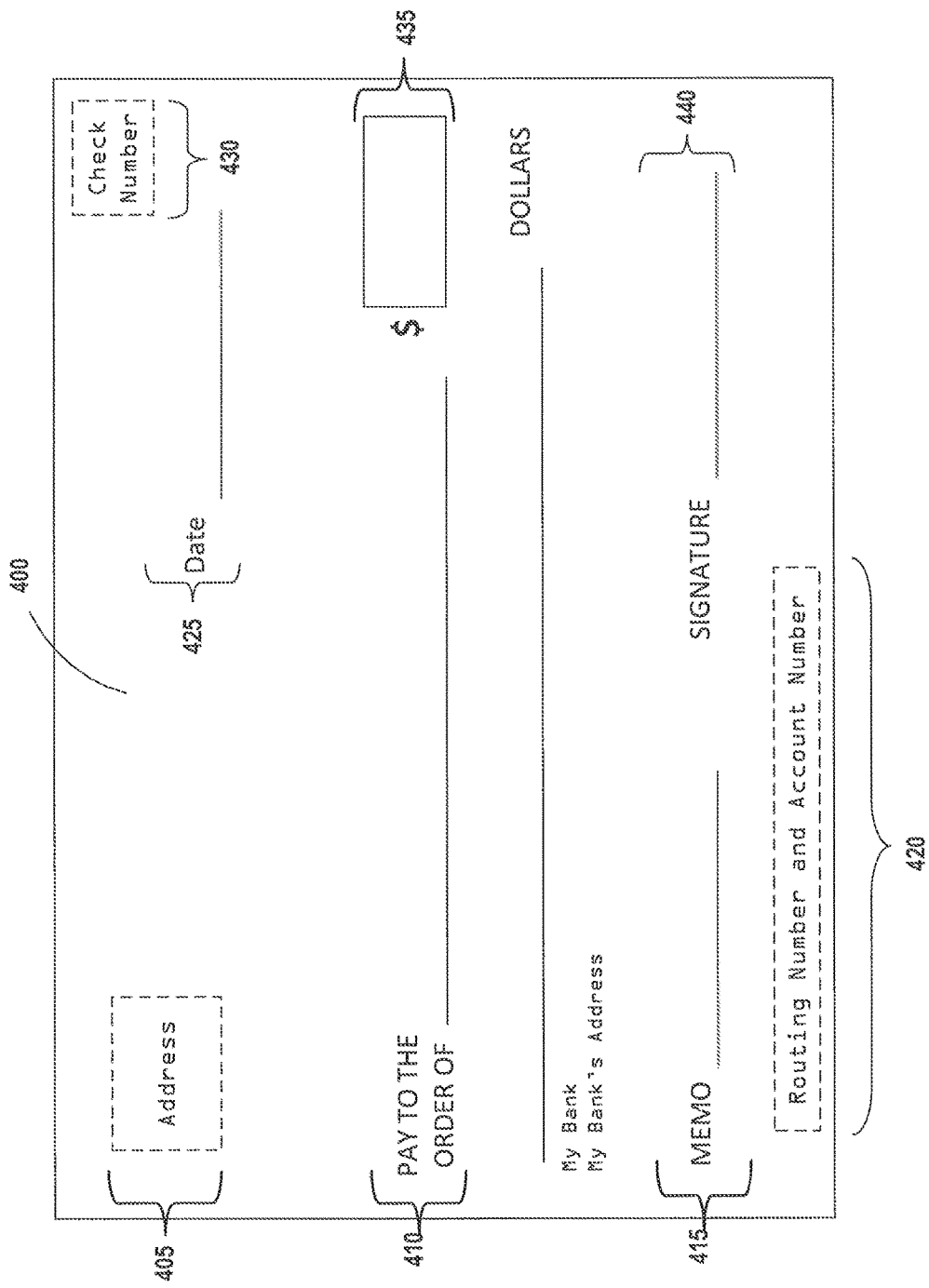
Figure 6:
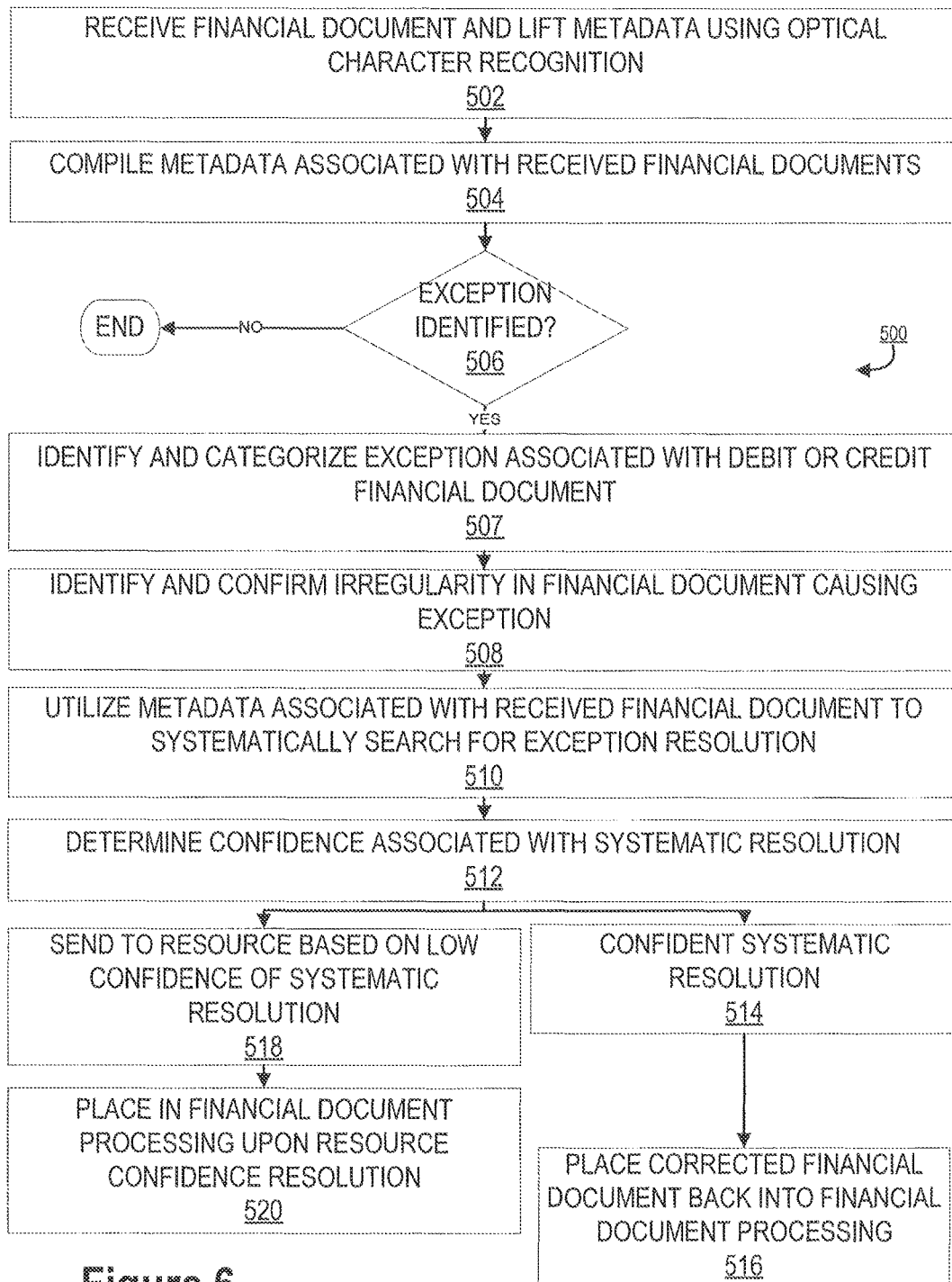
Figure 7:
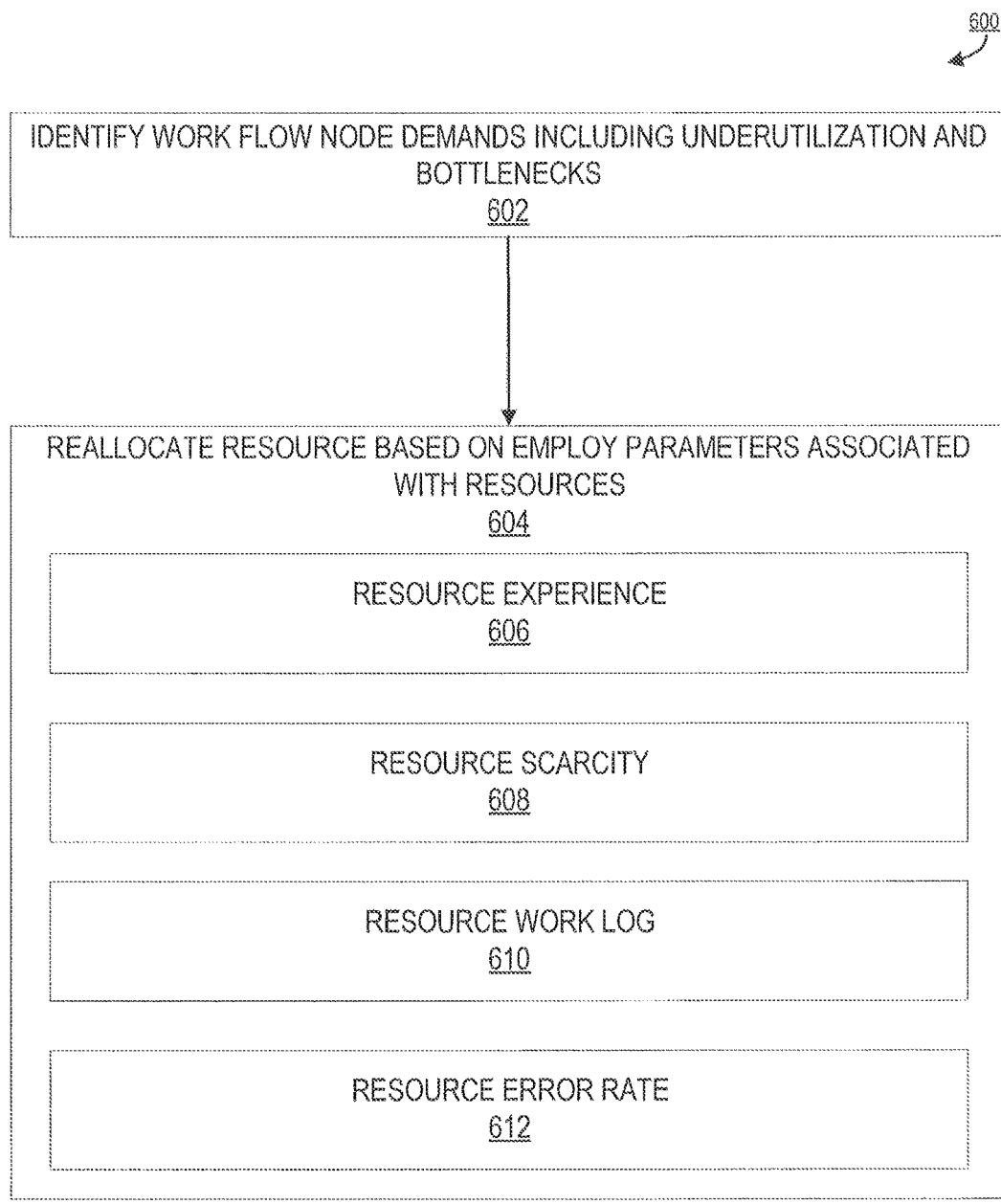
Figure 8:
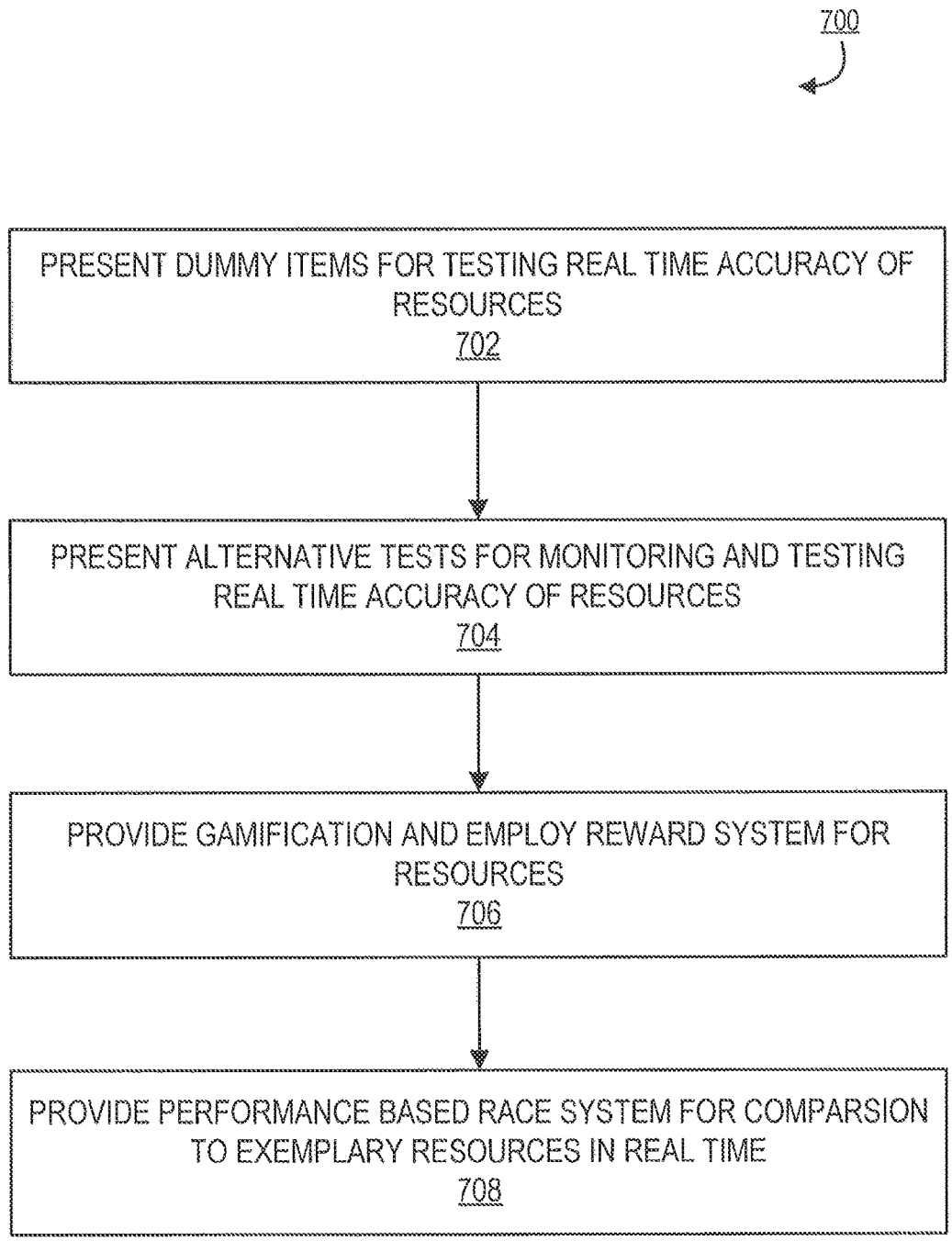
Figure 9:
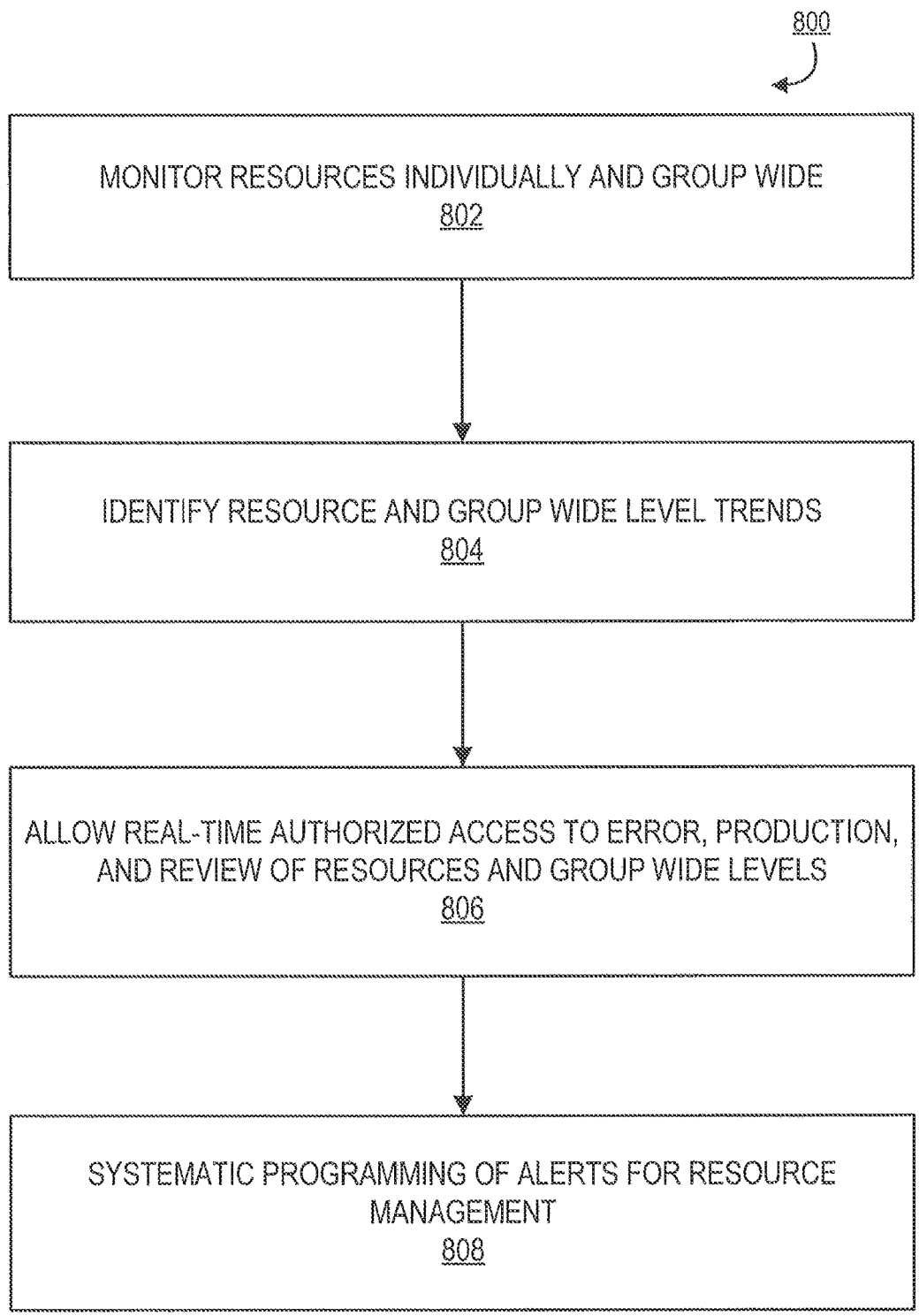

Having thus described embodiments of the invention in general terms, reference will now be made to the accompanying drawings, wherein:

FIG. 1 provides a dynamic resource management for document exception processing system environment, in accordance with one embodiment of the present invention;

FIG. 2A provides a high level process flow illustrating document exception identification and processing, in accordance with one embodiment of the present invention;

FIG. 2B provides a high level process flow illustrating general data lifting for document exception processing, in accordance with one embodiment of the present invention;

FIG. 3 provides a high level process flow illustrating identifying and extracting data from payment instruments, in accordance with one embodiment of the present invention;

FIG. 4 illustrates an exemplary image of a financial record, in accordance with one embodiment of the present invention;

FIG. 5 provides an exemplary template of a financial record, in accordance with one embodiment of the present invention;

FIG. 6 provides a process flow illustrating exception processing, in accordance with one embodiment of the present invention;

FIG. 7 provides a process flow illustrating work flow node monitoring and reallocation of resources, in accordance with one embodiment of the present invention;

FIG. 8 provides a process flow illustrating resource gamification and performance monitoring, in accordance with one embodiment of the present invention; and FIG. 9 provides a process flow illustrating resource and group work flow node monitoring trends, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. As used herein, a "document," "financial document," "financial record," or "payment instrument" may also refer to a myriad of financial documents, including but not limited to a lease document, a mortgage document, a deposit slip, a payment coupon, a receipt, general ledger tickets, or the like. In some embodiments, "document", "financial record" may exist as a physical item printed on paper or other medium. In other embodiments, the check may exist electronically. Furthermore, "document," "financial document," "financial record," or "payment instrument" may also refer to records associated with government data, legal data, identification data, and the like. Although the disclosure is directed to financial records, it will be understood that non-financial records such as social communications, advertising, blogs, opinion writing, and the like may also be applicable to the disclosure presented herein. In cases were non-financial records are use, it will be understood that personal information, such personal identifying information, account numbers, and the like, can be removed from the documents before they are released. For example, if a coupon or product review is to be used in advertising, personal information associated with such records will be removed before the advertising is presented to the public. The data of the financial records or non-financial records may be provided in a wide variety formats including, paper records, electronic or digital records, video records, audio records, and/or combinations thereof. In some embodiments, the "document" or "financial record" may be referred to in examples as a check or the like. Furthermore, the term "image lift data" or "data lift" may refer to the process of lifting one or more areas/elements of a document and storing those areas as metadata without storing the entire document as an image file.

Some portions of this disclosure are written in terms of a financial institution's unique position with respect document processing and retrieving. As such, a financial institution may be able to utilize its unique position to receive, store, process, and retrieve images of documents, such as those of a financial nature.

As presented herein, embodiments that detect and extract specific data from images and that analyze, process, and distribute extracted metadata are provided.

FIG. 1 illustrates a dynamic resource management for document exception processing system environment 200, in accordance with some embodiments of the invention. The environment 200 includes a check deposit device 211 associated or used with authorization of a user 210 (e.g., an account holder, a mobile application user, an image owner, a bank customer, and the like), a third party system 260, and a financial institution system 240. In some embodiments, the third party system 260 corresponds to a third party financial institution. The environment 200 further includes one or more third party systems 292 (e.g., a partner, agent, or contractor associated with a financial institution), one or more other financial institution systems 294 (e.g., a credit bureau, third party banks, and so forth), and one or more external systems 296.

The systems and devices communicate with one another over the network 230 and perform one or more of the various steps and/or methods according to embodiments of the disclosure discussed herein. The network 230 may include a local area network (LAN), a wide area network (WAN), and/or a global area network (GAN). The network 230 may provide for wireline, wireless, or a combination of wireline and wireless communication between devices in the network. In one embodiment, the network 230 includes the Internet.

The check deposit device 211, the third party system 260, and the financial institution system 240 each includes a computer system, server, multiple computer systems and/or servers or the like. The financial institution system 240, in the embodiments shown has a communication device 242 communicably coupled with a processing device 244, which is also communicably coupled with a memory device 246. The processing device 244 is configured to control the communication device 242 such that the financial institution system 240 communicates across the network 230 with one or more other systems. The processing device 244 is also configured to access the memory device 246 in order to read the computer readable instructions 248, which in some embodiments includes a one or more OCR engine applications 250 and a client keying application 251. The memory device 246 also includes a datastore 254 or database for storing pieces of data that can be accessed by the processing device 244. In some embodiments, the datastore 254 includes a check data repository.

As used herein, a "processing device," generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 214, 244, or 264 may further include functionality to operate one or more software programs based on computer-executable program code thereof, which may be stored in a memory. As the phrase is used herein, a processing device 214, 244, or 264 may be "configured to" perform a certain function in a variety of ways, including, for example, by having one or more general-purpose circuits perform the function by executing particular computer-executable program code embodied in computer-readable medium, and/or by having one or more application-specific circuits perform the function.

Furthermore, as used herein, a "memory device" generally refers to a device or combination of devices that store one or more forms of computer-readable media and/or computer-executable program code/instructions. Computer-readable media is defined in greater detail below. For example, in one embodiment, the memory device 246 includes any computer memory that provides an actual or virtual space to temporarily or permanently store data and/or commands provided to the processing device 244 when it carries out its functions described herein.

The check deposit device 211 includes a communication device 212 and an image capture device 215 (e.g., a camera) communicably coupled with a processing device 214, which is also communicably coupled with a memory device 216. The processing device 214 is configured to control the communication device 212 such that the check deposit device 211 communicates across the network 230 with one or more other systems. The processing device 214 is also configured to access the memory device 216 in order to read the computer readable instructions 218, which in some embodiments includes a capture application 220 and an online banking application 221. The memory device 216 also includes a datastore 222 or database for storing pieces of data that can be accessed by the processing device 214. The check deposit device 211 may be a mobile device of the user 210, a bank teller device, a third party device, an automated teller machine, a video teller machine, or another device capable of capturing a check image.

The third party system 260 includes a communication device 262 and an image capture device (not shown) communicably coupled with a processing device 264, which is also communicably coupled with a memory device 266. The processing device 264 is configured to control the communication device 262 such that the third party system 260 communicates across the network 230 with one or more other systems. The processing device 264 is also configured to access the memory device 266 in order to read the computer readable instructions 268, which in some embodiments includes a transaction application 270. The memory device 266 also includes a datastore 272 or database for storing pieces of data that can be accessed by the processing device 264.

In some embodiments, the capture application 220, the online banking application 221, and the transaction application 270 interact with the OCR engines 250 to receive or provide financial record images and data, detect and extract financial record data from financial record images, analyze financial record data, and implement business strategies, transactions, and processes. The OCR engines 250 and the client keying application 251 may be a suite of applications for conducting OCR.

In some embodiments, the capture application 220, the online banking application 221, and the transaction application 270 interact with the OCR engines 250 to utilize the extracted metadata to determine decisions for exception processing. In this way, the system may systematically resolve exceptions. The exceptions may include one or more irregularities such as bad micro line reads, outdated check stock, or misrepresentative checks that may result in a failure to match the check to an associated account for processing. As such, the system may identify the exception and code it for exception processing. Furthermore, the system may utilize the metadata to match the check to a particular account automatically.

In some embodiments, the capture application 220, the online banking application 221, and the transaction application 270 interact with the OCR engines 250 to utilize the extracted metadata for automated payment stops when detecting a suspect document or time during processing. In this way, the system may identify suspect items within the extracted metadata. The document or check processing may be stopped because of this identification. In some embodiments, the suspect items may be detected utilizing OCR based on data received from a customer external to the document in comparison to the document. In some embodiments, the suspect items may be detected utilizing OCR based on data associated with the account in comparison to the document.

In some embodiments, the capture application 220, the online banking application 221, and the transaction application 270 interact with the OCR engines 250 to utilize the extracted metadata for automated decisions for detecting and/or eliminating duplicate check processing. Duplicate checks may be detected and/or eliminated based on metadata matching. In this way, data may be lifted off of a document as metadata and compare the data to other documents utilizing the metadata form. As such, the system does not have to overlay images in order to detect duplicate documents.

The applications 220, 221, 250, 251, and 270 are for instructing the processing devices 214, 244 and 264 to perform various steps of the methods discussed herein, and/or other steps and/or similar steps. In various embodiments, one or more of the applications 220, 221, 250, 251, and 270 are included in the computer readable instructions stored in a memory device of one or more systems or devices other than the systems 260 and 240 and the check deposit device 211. For example, in some embodiments, the application 220 is stored and configured for being accessed by a processing device of one or more third party systems 292 connected to the network 230. In various embodiments, the applications 220, 221, 250, 251, and 270 stored and executed by different systems/devices are different. In some embodiments, the applications 220, 221, 250, 251, and 270 stored and executed by different systems may be similar and may be configured to communicate with one another, and in some embodiments, the applications 220, 221, 250, 251, and 270 may be considered to be working together as a singular application despite being stored and executed on different systems.

In various embodiments, one of the systems discussed above, such as the financial institution system 240, is more than one system and the various components of the system are not collocated, and in various embodiments, there are multiple components performing the functions indicated herein as a single device. For example, in one embodiment, multiple processing devices perform the functions of the processing device 244 of the financial institution system 240 described herein. In various embodiments, the financial institution system 240 includes one or more of the external systems 296 and/or any other system or component used in conjunction with or to perform any of the method steps discussed herein. For example, the financial institution system 240 may include a financial institution system, a credit agency system, and the like.

In various embodiments, the financial institution system 240, the third party system 260, and the check deposit device 211 and/or other systems may perform all or part of a one or more method steps discussed above and/or other method steps in association with the method steps discussed above. Furthermore, some or all the systems/devices discussed here, in association with other systems or without association with other systems, in association with steps being performed manually or without steps being performed manually, may perform one or more of the steps of method 300, the other methods discussed below, or other methods, processes or steps discussed herein or not discussed herein.

Referring now to FIG. 2A, FIG. 2A presents provides a high level process flow illustrating document exception identification and processing 150, in accordance with some embodiments of the invention. As illustrated in block 120, the method comprises receiving an image of a check. The image received may be one or more of a check, other document, payment instrument, and/or financial record. In some embodiments, the image of the check may be received by an specialized apparatus associated with the financial institution (e.g. a computer system) via a communicable link to a user's mobile device, a camera, an Automated Teller Machine (ATM) at one of the entity's facilities, a second apparatus at a teller's station, another financial institution, or the like. In other embodiments, the apparatus may be specially configured to capture the image of the check for storage and exception processing.

As illustrated in block 122, the system may then lift data off of the check (document, payment instrument, or financial record) using optical character recognition (OCR). The OCR processes enables the system to convert text and other symbols in the check images to other formats such as text files and/or metadata, which can then be used and incorporated into a variety of applications, documents, and processes. In some embodiments, OCR based algorithms used in the OCR processes incorporate pattern matching techniques. For example, each character in an imaged word, phrase, code, or string of alphanumeric text can be evaluated on a pixel-by-pixel basis and matched to a stored character. Various algorithms may be repeatedly applied to determine the best match between the image and stored characters.

After the successful retrieval or capture of the image of the check, the apparatus may process the check as illustrated in block 126. The apparatus may capture individual pieces of check information from the image of the check in metadata form. In some embodiments, the check information may be text. In other embodiments, the check information may be an image processed into a compatible data format.

As illustrated in block 124, the method comprises storing check information. After the image of the check is processed, the apparatus may store the lifted and collected check information in a compatible data format. In some embodiments, the check information may be stored as metadata. As such, individual elements of the check information may be stored separately, and may be associated with each other via metadata. In some embodiments, the individual pieces of check information may be stored together. In some embodiments, the apparatus may additionally store the original image of the check immediately after the image of the check is received.

As illustrated in block 128, the process 150 continues by identifying exceptions in the document processing. Exceptions may be one or more of irregularities such as bad micro line reads, outdated document stock, misrepresented items, or the like that result in a failure to match the document to an account. In some embodiments, the process may also detect duplicate documents. In yet other embodiments, the system may identify payment stops for specific documents.

Next, as illustrated in block 130, the process 150 continues to batch exceptions for processing and quieting them for resource review. In some embodiments, the system may first provide automated decisions for exception processing utilizing the lifted data. In this way, the system may utilize the data lifted from the document in order to rectify the exception identified in block 128. In this way, the system may be able to rectify the exception without having to have an individual manually override the exception and identify the account associated with the document with the exception. In some embodiments, a confidence of the automated decisions for exception processing may be generated. Upon a low confidence or that below a threshold such as 100%, 95%, or 90%, the system may queue the exception to a work flow node for payment instrument processing by a resource. The queue of the resource may be determined based on dynamic resource management described below.

Referring now to FIG. 2B, FIG. 2B presents provides a high level process flow illustrating general data lifting for document exception processing 160, in accordance with some embodiments of the invention. As illustrated in block 132, the process 160 starts by identifying the exceptions in financial document or payment instrument processing. Once identified, the documents associated with each of the one or more exceptions may be categorized as either debit or credit documents, as illustrated in block 134. In this way, the system may identify an exception and identify the type of document that the exception was identified from.

Next, as illustrate in decision block 136, the system may identify if the document is a check or if it is another financial document or payment instrument for processing. If the financial document is a check in decision block 136, the system will identify if the check is a pre-authorized draft check, as illustrated in block 138. In some embodiments, pre-authorized draft checks are made via online purchases that ask a user for his/her check number and routing number. The pre-authorized draft check is subsequently converted to paper form and submitted to the financial institution for processing. These pre-authorized draft checks may undergo a higher level of processing scrutiny to ensure authenticity, if necessary.

Next, as illustrated in block 140, automated decisions are created for the financial documents with exceptions based on lifted data and the type of exception identified. Once automated decisions are made, the system identifies a confidence of the automated decision.

In some embodiments, the system may send the exceptions for processing to a work flow node for exception processing by a resource, as illustrated in block 150. In yet other embodiments, the resource may receive an already automatically processed exception to confirm the correct processing.

Referring now to FIG. 3, FIG. 3 provides a high level process flow illustrating identifying and extracting data from payment instruments 100, in accordance with some embodiments in the invention. One or more devices, such as the one or more systems and/or one or more computing devices and/or servers of FIG. 3 can be configured to perform one or more steps of the process 100 or other processes described below. In some embodiments, the one or more devices performing the steps are associated with a financial institution. In other embodiments, the one or more devices performing the steps are associated with a merchant, business, partner, third party, credit agency, account holder, and/or user.

As illustrated at block 102, one or more check images are received. The check images comprise the front portion of a check, the back portion of a check, or any other portions of a check. In cases where there are several checks piled into a stack, the multiple check images may include, for example, at least a portion of each of the four sides of the check stack. In this way, any text, numbers, or other data provided on any side of the check stack may also be used in implementing the process 100. In some embodiments the system may receive financial documents, payment instruments, checks, or the likes.

In some embodiments, each of the check images comprises financial record data. The financial record data includes dates financial records are issued, terms of the financial record, time period that the financial record is in effect, identification of parties associated with the financial record, payee information, payor information, obligations of parties to a contract, purchase amount, loan amount, consideration for a contract, representations and warranties, product return policies, product descriptions, check numbers, document identifiers, account numbers, merchant codes, file identifiers, source identifiers, and the like.

Although check images are illustrated in FIG. 4 and FIG. 5, it will be understood that any type of financial record image may be received. Exemplary check images include PDF files, scanned documents, digital photographs, and the like. At least a portion of each of the check images, in some embodiments, is received from a financial institution, a merchant, a signatory of the financial record (e.g., the entity having authority to endorse or issue a financial record), and/or a party to a financial record. In other embodiments, the check images are received from image owners, account holders, agents of account holders, family members of account holders, financial institution customers, payors, payees, third parties, and the like. In some embodiments, the source of at least one of the checks includes an authorized source such as an account holder or a third party financial institution. In other embodiments, the source of at least one of the checks includes an unauthorized source such as an entity that intentionally or unintentionally deposits or provides a check image to the system of process 100.

In some exemplary embodiments, a customer or other entity takes a picture of a check at a point of sales or an automated teller machine (ATM) and communicates the resulting check image to a point of sales device or ATM via wireless technologies, near field communication (NFC), radio frequency identification (RFID), and other technologies. In other examples, the customer uploads or otherwise sends the check image to the system of process 100 via email, short messaging service (SMS) text, a web portal, online account, mobile applications, and the like. For example, the customer may upload a check image to deposit funds into an account or pay a bill via a mobile banking application using a capture device. The capture device can include any type or number of devices for capturing images or converting a check to any type of electronic format such as a camera, personal computer, laptop, notebook, scanner, mobile device, and/or other device.

As illustrated at block 104, optical character recognition (OCR) processes are applied to at least a portion of the check images. At least one OCR process may be applied to each of the check images or some of the check images. The OCR processes enables the system to convert text and other symbols in the check images to other formats such as text files and/or metadata, which can then be used and incorporated into a variety of applications, documents, and processes. In some embodiments, OCR based algorithms used in the OCR processes incorporate pattern matching techniques. For example, each character in an imaged word, phrase, code, or string of alphanumeric text can be evaluated on a pixel-by-pixel basis and matched to a stored character. Various algorithms may be repeatedly applied to determine the best match between the image and stored characters.

As illustrated in block 106, the check data may be identified based on the applied OCR processing. In some embodiments, the OCR process includes location fields for determining the position of data on the check image. Based on the position of the data, the system can identify the type of data in the location fields to aid in character recognition. For example, an OCR engine may determine that text identified in the upper right portion of a check image corresponds to a check number. The location fields can be defined using any number of techniques. In some embodiments, the location fields are defined using heuristics. The heuristics may be embodied in rules that are applied by the system for determining approximate location.

In other embodiments, the system executing process flow 100 defines the location fields by separating the portions and/or elements of the image of the check into quadrants. As referred to herein, the term quadrant is used broadly to describe the process of differentiating elements of a check image by separating portions and/or elements of the image of the check into sectors in order to define the location fields. These sectors may be identified using a two-dimensional coordinate system or any other system that can be used for determining the location of the sectors. In many instances, each sector will be rectangular in shape. In some embodiments, the system identifies each portion of the image of the check using a plurality of quadrants. In such an embodiment, the system may further analyze each quadrant using the OCR algorithms in order to determine whether each quadrant has valuable or useful information. Generally, valuable or useful information may relate to any data or information that may be used for processing and/or settlement of the check, used for identifying the check, and the like. Once the system determines the quadrants of the image of the check having valuable and/or useful information, the system can extract the identified quadrants together with the information from the image of the check for storage. The quadrants may be extracted as metadata, text, or code representing the contents of the quadrant. In some embodiments, the quadrants of the image of the check that are not identified as having valuable and/or useful information are not extracted from the image.

In additional embodiments, the system uses a grid system to identify non-data and data elements of a check image. The grid system may be similar to the quadrant system. Using the grid system, the system identifies the position of each grid element using a coordinate system (e.g., x and y coordinates or x, y, and z coordinate system or the like) or similar system for identifying the spatial location of a grid element on a check. In practice, the spatial location of a grid element may be appended to or some manner related to grid elements with check data. For example, using the grid, the system may identify which grid elements of the grid contain data elements, such as check amount and payee name, and either at the time of image capture or extraction of the check image within the grid, the system can tag the grid element having the check data element with the grid element's spatial location. In some embodiments, the grid system and/or quadrant system is based on stock check templates obtained from check manufacturers or merchants.

In alternative or additional embodiments, the OCR process includes predefined fields to identify data. The predefined field includes one or more characters, words, or phrases that indicate a type of data. In such embodiments, the system of process 100 extracts all the data presented in the check image regardless of the location of the data and uses the predefined fields to aid in character recognition. For example, a predefined field containing the phrase "Pay to the order of" may be used to determine that data following the predefined field relates to payee information.

In addition to OCR processes, the system of process 100 can use other techniques such as image overlay to locate, identify, and extract data from the check images. In other embodiments, the system uses the magnetic ink character recognition (MICR) to determine the position of non-data (e.g., white space) and data elements on a check image. For example, the MICR of a check may indicate to the system that the received or captured check image is a business check with certain dimensions and also, detailing the location of data elements, such as the check amount box or Payee line. In such an instance, once the positions of this information is made available to the system, the system will know to capture any data elements to the right or to the left of the identified locations or include the identified data element in the capture. This system may choose to capture the data elements of a check in any manner using the information determined from the MICR number of the check.

As illustrated at block 108, unrecognized data from the check images is detected. In some embodiments, the unrecognized data includes characters, text, shading, or any other data not identified by the OCR processes. In such embodiments, the unrecognized data is detected following implementation of at least one of the OCR processes. In other embodiments, the unrecognized data is detected prior to application of the OCR processes. For example, the unrecognized data may be removed and separated from the check images or otherwise not subjected to the OCR processes. In one exemplary situation, the system may determine that handwritten portions of a check image should not undergo OCR processing due to the difficulty in identifying such handwritten portions. Exemplary unrecognized data includes handwritten text, blurred text, faded text, misaligned text, misspelled data, any data not recognized by the OCR processes or other data recognition techniques, and the like. In other cases, at least a portion of some or all of the check images may undergo pre-processing to enhance or correct the unrecognized data. For example, if the text of a check image is misaligned or blurry, the system may correct that portion of the check image before applying the OCR processes to increase the probability of successful text recognition in the OCR processes or other image processes.

As illustrated at block 110, in some embodiments the system will have one or more resources review the unrecognized data. As such, there may be one or more individuals reviewing the unrecognized data instead of mechanically reviewing the data. As illustrated in block 110, the system may receive input from the resource that provides information identifying the unrecognized data. As such, a resource may be provided with the portions of a check image corresponding to the unrecognized data. The resource can view the unrecognized data to translate the unrecognized data into text and input the translation into a check data repository. In this way, the system "learns" to recognize previously unrecognized data identified by the resource, such that when the system reviews the same or similar unrecognized data in the future, such data can be easily identified by reference to the check data repository.

In other embodiments, the system may present an online banking customer with the unrecognized data to solicit input directly from the customer. For example, the customer may be presented with operator-defined terms of previously unrecognized data to verify if such terms are correct. The system may solicit corrective input from the customer via an online banking portal, a mobile banking application, and the like. If an operator or resource initially determines that the handwriting on the memo line reads "house flaps," the customer may subsequently correct the operator's definition and update the check data repository so that the handwritten portion correctly corresponds to "mouse traps." In some embodiments, the customer's input is stored in a customer input repository, which is linked to the check data repository associated with the OCR processes. For example, the system can create a file path linking the customer input repository with the check data repository to automatically update the check data repository with the customer input. In other embodiments, the check data repository and/or customer input repository includes stored customer data or account data. Stored customer signatures, for example, may be included in the check data repository and/or customer input repository.

As illustrated at block 111, the process 100 continues by determining, based on the confidence level of the resource and initial unrecognized data, determine if a secondary check of the unrecognized data is necessary. As such, based on a confidence level determined from the resource, the system may require additional checking to confirm the accuracy of the identification of the unrecognized data from the check.

Finally, as illustrated in block 112, business strategies and transactions are processed based on at least one of the check data and the inputted information. Data extracted from the check images using the process 100 may be used to automate or enhance various processes such as remediating exception processes, replacing check images with check data in online statements, enforcing requirements regarding third party check deposits, facilitating check to automated clearing house transaction conversion, cross selling products, and so forth.

FIG. 4 provides an illustration of an exemplary image of a financial record 300, in accordance with one embodiment of the present invention. The financial record illustrated in FIG. 4 is a check. However, one will appreciate that any financial record, financial document, payment instrument, or the like may be provided.

The image of check 300 may comprise an image of the entire check, a thumbnail version of the image of the check, individual pieces of check information, all or some portion of the front of the check, all or some portion of the back of the check, or the like. Check 300 comprises check information, wherein the check information comprises contact information 305, the payee 310, the memo description 315, the account number and routing number 320 associated with the appropriate user or customer account, the date 325, the check number 330, the amount of the check 335, the signature 340, or the like. In some embodiments, the check information may comprise text. In other embodiments, the check information may comprise an image. A capture device may capture an image of the check 300 and transmit the image to a system of a financial institution via a network. The system may collect the check information from the image of the check 300 and store the check information in a datastore as metadata. In some embodiments, the pieces of check information may be stored in the datastore individually. In other embodiments, multiple pieces of check information may be stored in the datastore together.

FIG. 5 illustrates an exemplary template of a financial record 400, in accordance with one embodiment of the present invention. Again, the financial record illustrated in FIG. 5 is a check. However, one will appreciate that any financial record, financial document, payment instruments, or the like may be provided.

In the illustrated embodiment, the check template 400 corresponds to the entire front portion of a check, but it will be understood that the check template 400 may also correspond to individual pieces of check information, portions of a check, or the like. The check template, in some embodiments, includes the format of certain types of checks associated with a bank, a merchant, an account holder, types of checks, style of checks, check manufacturer, and so forth. By using the check template, the system may "learn" to map the key attributes of the check for faster and more accurate processing. In some embodiments, financial records are categorized by template. The check template 400 is only an exemplary template for a financial record, and other check templates or other financial record templates may be utilized to categorize checks or other financial records. The check template 400 can be used in the OCR processes, image overlay techniques, and the like.

The check template 400 comprises check information, wherein the check information includes, for example, a contact information field 405, a payee line field 410, a memo description field 415, an account number and routing number field 420 associated with the appropriate user or customer account, a date line field 425, a check number field 430, an amount box field 435, a signature line field 440, or the like.

FIG. 6 illustrates a process flow for exception processing 500, in accordance with one embodiment of the present invention. As illustrated in block 502, the process 500 is initiated when financial documents or payment instruments, such as checks, are received. The received financial document may be in various forms, such as in an image format. Processing of the document may proceed wherein the data from the document may be collected and lifted from the document as metadata. This metadata is lifted from the document utilizing optical character recognition (OCR). The OCR processes enables the system to convert text and other symbols in the document image to metadata, which can then be used and incorporated into exception processing. In some embodiments, OCR based algorithms used in the OCR processes incorporate pattern matching techniques. For example, each character in an imaged word, phrase, code, or string of alphanumeric text can be evaluated on a pixel-by-pixel basis and matched to a stored character. Various algorithms may be repeatedly applied to determine the best match between the image and stored characters.

Once the metadata is lifted from the document as illustrated in block 502, the process 500 continues to compile and store the metadata associated with the received financial documents, as illustrated in block 504. As such, after the image of the document, such as a check, is processed, the system may compile and store the lifted and collected check information as metadata. As such, individual elements of the check information may be stored separately, together, or the like. In this way, the system stores the type of document, the appearance of the document, the information on the document, such as numbers, accounts, dates, names, addresses, payee, payor, routing numbers, amounts, document backgrounds, or the like as metadata.

In some embodiments, the stored data may be structural metadata. As such, the data may be about the design and specification of the structure of the data. In other embodiments, the data may be descriptive metadata. As such, the data may be data describing in detail the content of the financial record or document. In some embodiments, the metadata as described herein may take the form of structural, descriptive and/or a combination thereof.

Next, as illustrated in decision block 506, the system monitors the received documents to identify exceptions in the document processing. Exceptions may be one or more of irregularities such as bad micro line reads, outdated document stock, misrepresented items, or the like that result in a failure to match the document to an account intended to be associated with that document. If no exception is identified, then the process 500 terminates.

As illustrated in block 507 the process 500 continues to identify and categorize any identified exceptions into financial documents associated with debits or financial documents associated with credits. As illustrated in block 508 the process 500 continues to confirm the irregularity in the financial document that lead to the exception identification in decision block 506. The irregularity that lead to the exception may be one or more of a bad micro line read, outdated documents (such as an outdated check or deposit statement), or a general failure of the document to match an existing financial account.

Next, as illustrated in block 510, the process 500 continues to utilize the metadata associated with the received financial documents to systematically search for exception resolutions. As such, providing automated decisions for exception processing utilizing the lifted metadata. As such, the metadata lifted from the financial documents may be utilized to search the accounts or other records at the financial institution to determine the correct account or record associated with the exception document. For example, the exception may include an outdated check. In this way, one or more of the routing numbers, account numbers, or the like may be incorrectly stated on the check. The system will take the data on that outdated check and convert it to a metadata format. Thus, the system will utilize the metadata format of the routing number or the like to search the financial institution records to identify that that particular routing number was used for a batch of checks for User 1. As such, the system will identify the correct user, User 1 associated with the check that had an exception. Other examples may include one or more of bad micro line reads, document or check format issues, or the like.

As such, the system may utilize the metadata lifted from the document in order to rectify the exception identified in decision block 506. In this way, the system may be able to rectify the exception without having to have an individual manually override the exception and identify the account associated with the document with the exception.

Next, as illustrated in block 512, the process 500 continues by determining a confidence associated with the systematic resolution for exception resolution. In this way, a confidence of the automated resolution is determined. If the confidence is not satisfactory, such as not being above a pre-determined threshold, the system may send the exception to a resource based on the confidence score not reaching a pre-determined threshold, as illustrated in block 518. Next, as illustrated in block 520, the system pay place the resolved exception into financial document processing after resolution and confirmation from the resource.

Referring back to block 512 of FIG. 6, if a confidence is generated significantly high enough to reach the pre-determined threshold, the system continues and automatically and systematically corrects the exception based on the match based on the confident systematic resolution, as illustrated in block 514. In some embodiments, there may be one or more threshold confidences related to the exception. As such, if a match has been made between the metadata and a financial account and it is above a pre-determined confidence, then the system may automatically correct the exception. However, in some embodiments, the system may request manual acceptance of the correction of the exception.

Finally, as illustrated in block 516, the corrected financial document may be placed back into the financial document processing for continued processing after the exception has been identified and corrected via systematic searching financial institution data utilizing metadata extracted from the original financial document with an exception.

FIG. 7 illustrates a process flow for work flow node monitoring and reallocation of resources 600, in accordance with one embodiment of the present invention. The process 600 is initiated by identifying work flow node demands including underutilization and bottlenecks, as illustrated in block 602. The work flow node includes one or more resources in the work flow node that are specialized for exception processing. As such, each work flow node may contain resources that are specialized for a particular exception processing.

The system may monitor each of the work flow nodes associated with the exception processing to identify which nodes are not being utilized to capacity or for their specialization. The system also monitors each of the work flow nodes to determine if there are bottlenecks or back logs within the nodes that may cause a delay in one or more exceptions being processed.

Next, as illustrated in block 604, the system may reallocate resources based on employed parameters associated with the resources and/or work flow nodes. As such, based on pre-determined parameters associated with individual resources or work flow nodes, the system may reallocate work, such as exception processing, such that the resources are utilized for their experience and have a balanced work load such that no node has a backlog or bottleneck of exceptions for processing.

As illustrated in block 606, one of the parameters utilized to reallocate exception processing includes the resource experience. In this way, the system identifies the experience a resource may have with exception processing. This experience may include reading micro lines, identifying duplicates, overall exception identification, or the like.

As illustrated in block 608, one of the parameters utilized to reallocate exception processing includes resource scarcity. In this way, the system identifies the limited number of resources that are available to be utilized for a particular exception processing issue.

As illustrated in block 610, one of the parameters utilized to reallocate exception processing includes a review of the resource work log. In this way, the system may review the resource's work load, speed, ability, or the like in the work log associated with the resource. The system may generate and/or maintain the work log per each resource based on his/her performance.

As illustrated in block 612, one of the parameters utilized to reallocate exception processing includes the resource error rate. In this way the error rate for processing that type of exception is identified for that particular resource. This data may be utilized to reallocate or distribute exception processing across the entity.

Utilizing the reallocation parameters, the system determines a location for each exception to be processed. The parameters may be weighted to determine the location. As such, parameters such as resource experience or resource scarcity may be weighted stronger than other parameters in order to match an appropriate resource to the exception. In some embodiments, the parameters may be scored and weighted in order to reallocate the exception to the appropriate resource. In yet other embodiments, an aggregate scoring of the parameters may be utilized to determine the reallocation of the exception.

FIG. 8 illustrates a process flow for resource gamification and performance monitoring 700, in accordance with one embodiment of the present invention. As illustrated in block 702, the process 700 is initiated by providing dummy items to a resource for testing real time accuracy of the resource. In this way, the system may provide dummy exception items to the resource for exception processing, where the exception is known to the system. In this way, the system can actively monitor any errors made by the resource without the errors effecting real exceptions and processing. As such, the system may utilize a known dummy exception, such as a duplicate item, micro line error, or the like. As such, presenting a dummy item allows the system to test resources and their accuracy for specific exceptions. Furthermore, this testing allows the system to further identify one or more expertise for a resource for exception processing.

Next, as illustrated in block 704, the process 700 continues by presenting alternative tests for monitoring and testing real time accuracy of the resources. Alternative tests may include one or more additional dummy exceptions, known exceptions, dummy payment instruments, or the like.

As illustrated in block 706, the system may also provide gamification and employ reward systems for the resources. In some embodiments, the system may provide gamification tools to the resource. As such, the resource may be provided with a game like environment superimposed on his/her resource system that allows the resource to score points and/or play a simulated game with his/her queue of exceptions and processing of the same. As such, the resource may be able to play or participate in a game like environment to process exceptions. The game like superimposed environment may include scoring, levels, animation, and/or the like. In some embodiments, the system may employ rewards for the resource based on performance. In this way, the system may identify rewards to resources for hitting goals, specific performances, of the like. Rewards may be trophies, gift cards, money, food, bonuses, or the like.

Finally, as illustrated in block 708, the process is complete by providing a performance based race system for comparing the resource to exemplary resources in real time. In this way, in the superimposed gamification screen, the system may provide one or more race statistics showing the pace or speed of one or more exemplary resources to the resource. In this way, providing a motivation for the resource for a pace or speed to match while exception processing.

FIG. 9 provides a process flow illustrating resource and group work flow node monitoring trends 800, in accordance with one embodiment of the present invention. As illustrated in block 802, the process is initiated by monitoring resources individually and group wide. The monitoring included a pace of exception processing, an accuracy of exception processing, a specialization of the resources, or the like.

Next, as illustrated in block 804, the process 800 continues by identifying resource and group wide level trends. The trends identified may include identifying an error that is made by the resource multiple times, a particular exception processing that the resource is proficient at, and/or one or more specializations of the resource or group.

As illustrated in block 806, the process 800 continues by allowing real-time authorized access to error, production, and review of resources and group wide levels. In this way, the system may allow managers or supervisors to access errors, production, or review data associated with one or more resources at any time. This allows the manager to review information regarding the exception processing at any time and in real-time.

Finally, as illustrated in block 808, the process 800 is completed by systematic programming of alerts for resource management. In this way, the system may systematically and automatically program alerts for managers. The alerts may be learned by the system based on inquiries by managers, identified trends, monitored resources, or the like. As such, once the items for alerts and a level associated with that item are identified, the system may set the alert. The level associated with the item may include a numerical value, threshold, or the like associated with an error rate or trend of a resource. Furthermore, the alerts may notify management as to whether resources will be needing after hours to finalize items.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, or the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a verity of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, or the like) that can direct a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

| U.S. patent application Ser. No. | Title | Filed On |
|---|---|---|
| 14/750,408 now U.S. Pat. No. 10,049,350 | ELEMENT LEVEL PRESENTATION OF ELEMENTS OF A PAYMENT INSTRUMENT FOR EXCEPTIONS PROCESSING | Concurrently Herewith |
| 14/750,419 now published as 2016/0379186 | ELEMENT LEVEL CONFIDENCE SCORING OF ELEMENTS OF A PAYMENT INSTRUMENT FOR EXCPETIONS PROCESSING | Concurrently Herewith |
| 14/750,666 now published as 2016/0379199 | ENSURING BATCH INTEGRITY IN A PAYMENT INSTRUMENT EXCEPTIONS PROCESSING SYSTEM | Concurrently Herewith |

-continued

| U.S. patent application Ser. No. | Title | Filed On |
|---|---|---|
| 14/750,684 now U.S. Pat. No. 10,115,081 | MONITORING MODULE USAGE IN A DATA PROCESSING SYSTEM | Concurrently Herewith |
| 14/750,393 now U.S. Pat. No. 10,229,395 | PREDICTIVE DETERMINATION AND RESOLUTION OF A VALUE OF INDICIA LOCATED IN A NEGOTIABLE INSTRUMENT ELECTRONIC IMAGE | Concurrently Herewith |

What is claimed is:

1. A system for document exception processing, the system comprising:
a memory device with computer-readable program code stored thereon;
a communication device;
a processing device operatively coupled to the memory device and the communication device, wherein the processing device is configured to execute the computer-readable program code to:
receive an indication of a user transaction, wherein receiving an indication of the user transaction comprises extraction of a copy of documents associated with the user transaction via a mobile device, wherein the copy of documents comprises at least one image captured by the mobile device;
identify data from the documents, wherein the data from the documents is extracted from the documents using optical character recognition and the data is stored, wherein identifying data from the documents associated with the user transaction further comprises capturing via optical character recognition, images of various elements of the documents, wherein the various elements are unique to the documents, wherein the identified data is stored as metadata;
identify and categorize exceptions in the documents that are being processed, wherein identifying and categorizing exceptions in the documents comprise sending the document to work flow node for exception processing;
search, based on the data from the documents, accounts to determine an amount and a record associated with the documents for exception processing for correction of the exception;
match, systematically, an appropriate account from the searched accounts to the documents comprising exceptions, wherein the match is based on a comparison between extracted data from the document comprising exceptions to known data associated with accounts, wherein the documents are financial documents, wherein the match is based on the comparison between extracted data from the financial document comprising exceptions to known data associated with financial accounts;
determine a confidence of correction for the systematic matching;
identify bottlenecks in the exception processing via monitor work flow of resources for exception processing;
determine resource experience and error rate for each of one or more different exception types;
match an appropriate resource with the identified and categorized exception based on the resource experience, resource scarcity, and resource error rate for the category of exception;
replace the exception, upon resource correction of exception, and allow the documents comprising the exception to be processed; and
superimpose gamification and reward data on a display for the resource such that exception processing is performed by the resource via the display, wherein gamification comprises superimposing performance based race system for comparison of productivity of resource relative to exemplary resource in real-time.

2. The system of claim 1, wherein monitor work flow of resources for exception processing further comprises providing dummy exceptions for monitoring real-time work flow of resource.

3. The system of claim 1 further comprising superimposing gamification and reward data on a display for the resource such that exception processing is performed by the resource via the superimposed display.

4. The system of claim 1 further comprising providing managers of the resources with real-time access to resource errors and resource production.

5. The system of claim 1, wherein processing the financial documents further comprises directing a document without an exception to an appropriate account associated with the document such that payment for the user transaction associated with the document is completed.

6. The system of claim 1, wherein exceptions comprise one or more irregularities in the documents such as bad micro line reads, outdated check stock, or misrepresentative checks.

7. A computer program product for document exception processing, the computer program product comprising at least one non-transitory computer-readable medium having computer-readable program code portions embodied therein, the computer-readable program code portions comprising:
an executable portion configured for receiving an indication of a user transaction, wherein receiving an indication of the user transaction comprises extraction of a copy of documents associated with the user transaction via a mobile device, wherein the copy of documents comprises at least one image captured by the mobile device;
an executable portion configured for identifying data from the documents, wherein the data from the documents is extracted from the documents using optical character recognition and the data is stored, wherein identifying data from the documents associated with the user transaction further comprises capturing via optical character recognition, images of various elements of the documents, wherein the various elements are unique to the documents, wherein the identified data is stored as metadata;
an executable portion configured for identifying and categorizing exceptions in the documents that are being processed, wherein identifying and categorizing exceptions in the documents comprise sending the document to work flow node for exception processing;
an executable portion configured for searching, based on the data from the documents, accounts to determine an amount and a record associated with the documents for exception processing for correction of the exception;
an executable portion configured for matching, systematically, an appropriate account from the searched accounts to the documents comprising exceptions, wherein the match is based on a comparison between extracted data from the document comprising exceptions to known data associated with accounts, wherein the documents are financial documents, wherein the match is based on the comparison between extracted data from the financial document comprising exceptions to known data associated with financial accounts;

determine a confidence of correction for the systematic matching;

an executable portion configured for identifying bottlenecks in the exception processing via monitor work flow of resources for exception processing;

an executable portion configured for determining resource experience and error rate for each of one or more different exception types;

an executable portion configured for matching an appropriate resource with the identified and categorized exception based on the resource experience, resource scarcity, and resource error rate for the category of exception;

an executable portion configured for replacing the exception, upon resource correction of exception, and allow the documents comprising the exception to be processed; and superimpose gamification and reward data on a display for the resource such that exception processing is performed by the resource via the display, wherein gamification comprises superimposing performance based race system for comparison of productivity of resource relative to exemplary resource in real-time.

8. The computer program product of claim 7, wherein monitor work flow of resources for exception processing further comprises providing dummy exceptions for monitoring real-time work flow of resource.

9. The computer program product of claim 7 further comprising superimposing gamification and reward data on a display for the resource such that exception processing is performed by the resource via the superimposed display.

10. The computer program product of claim 9, wherein gamification comprises superimposing performance based race system for comparison of productivity of resource relative to exemplary resource in real-time.

11. The computer program product of claim 7 further comprising providing managers of the resources with real-time access to resource errors and resource production.

12. A computer-implemented method for document exception processing, the method comprising:
providing a computing system comprising a computer processing device and a non-transitory computer readable medium, where the computer readable medium comprises configured computer program instruction code, such that when said instruction code is operated by said computer processing device, said computer processing device performs the following operations:
receiving an indication of a user transaction, wherein receiving an indication of the user transaction comprises extraction of a copy of documents associated with the user transaction via a mobile device, wherein the copy of documents comprises at least one image captured by the mobile device;
identifying data from the documents, wherein the data from the documents is extracted from the documents using optical character recognition and the data is stored, wherein identifying data from the documents associated with the user transaction further comprises capturing via optical character recognition, images of various elements of the documents, wherein the various elements are unique to the documents, wherein the identified data is stored as metadata;
identifying and categorizing exceptions in the documents that are being processed, wherein identifying and categorizing exceptions in the documents comprise sending the document to work flow node for exception processing;
searching, based on the data from the documents, accounts to determine an amount and a record associated with the documents for exception processing for correction of the exception;
matching, systematically, an appropriate account from the searched accounts to the documents comprising exceptions, wherein the match is based on a comparison between extracted data from the document comprising exceptions to known data associated with accounts, wherein the documents are financial documents, wherein the matching is based on the comparison between extracted data from the financial document comprising exceptions to known data associated with financial accounts;
determining a confidence of correction for the systematic matching;
identifying bottlenecks in the exception processing via monitor work flow of resources for exception processing;
determining resource experience and error rate for each of one or more different exception types;
matching an appropriate resource with the identified and categorized exception based on the resource experience, resource scarcity, and resource error rate for the category of exception;
replacing the exception, upon resource correction of exception, and allow the documents comprising the exception to be processed; and
superimposing gamification and reward data on a display for the resource such that exception processing is performed by the resource via the display, wherein gamification comprises superimposing performance based race system for comparison of productivity of resource relative to exemplary resource in real-time.

13. The computer-implemented method of claim 12, wherein monitor work flow of resources for exception processing further comprises providing dummy exceptions for monitoring real-time work flow of resource.

14. The computer-implemented method of claim 12 further comprising superimposing gamification and reward data on a display for the resource such that exception processing is performed by the resource via the superimposed display.

15. The computer-implemented method of claim 14, wherein gamification comprises superimposing performance based race system for comparison of productivity of resource relative to exemplary resource in real-time.

16. The computer-implemented method of claim 12 further comprising providing managers of the resources with real-time access to resource errors and resource production.

* * * * *